US012651181B1

(12) United States Patent
Krishnan et al.

(10) Patent No.: US 12,651,181 B1
(45) Date of Patent: Jun. 9, 2026

(54) DYNAMIC LANGUAGE GENERATION FOR EXPLAINABLE OUTPUTS IN CONVERSATIONAL LANGUAGE MODELS

(71) Applicant: QpiAI India Private Limited, Bangalore (IN)

(72) Inventors: Aswanth Krishnan, Bengaluru (IN); Sachin Kumar, Bengaluru (IN); Nagendra Nagaraja, Bangalore (IN)

(73) Assignee: QpiAI India Private Limited, Bangalore (IN)

( * ) Notice: Subject to any disclaimer, the term of this patent is extended or adjusted under 35 U.S.C. 154(b) by 0 days.

(21) Appl. No.: 19/363,454

(22) Filed: Oct. 20, 2025

(51) Int. Cl.
  *G06N 20/00* (2019.01)
  *G06N 5/04* (2023.01)
(52) U.S. Cl.
  CPC .............. *G06N 5/04* (2013.01); *G06N 20/00* (2019.01)
(58) Field of Classification Search
  CPC ................................. G06N 5/04; G06N 20/00
  See application file for complete search history.

(56) References Cited

U.S. PATENT DOCUMENTS

2026/0003900 A1* 1/2026 Hashimoto ........... G06F 16/334

FOREIGN PATENT DOCUMENTS

WO    WO-2025024666 A2 *  1/2025  ........... G06F 16/243

OTHER PUBLICATIONS

Wang, Bailin, Zi Wang, Xuezhi Wang, Yuan Cao, Rif A Saurous, and Yoon Kim. "Grammar prompting for domain-specific language generation with large language models." Advances in Neural Information Processing Systems 36 (2023): 65030-65055. (Year: 2023).*

* cited by examiner

*Primary Examiner* — Casey R. Garner
(74) *Attorney, Agent, or Firm* — Foley & Lardner LLP

(57) ABSTRACT

In some embodiments, a system may enable autonomous reasoning in real-time communications by dynamically generating and executing DSLs based on context. The method includes determining a computational intent specification from messages exchanged in a communication session and accessing knowledge sources relevant to the computational intent specification. The method further includes generating a DSL using a generative language model based on the computational intent, the messages, and the knowledge sources, where the language defines constructs and syntax rules specifying allowable compositions of named entities and relationships. The method further includes executing the constructs to perform reasoning operations and generate an output message responsive to the messages. The method further includes presenting the output message within the real-time communication platform and storing an execution trace mapping the constructs to portions of the output message.

20 Claims, 6 Drawing Sheets

400

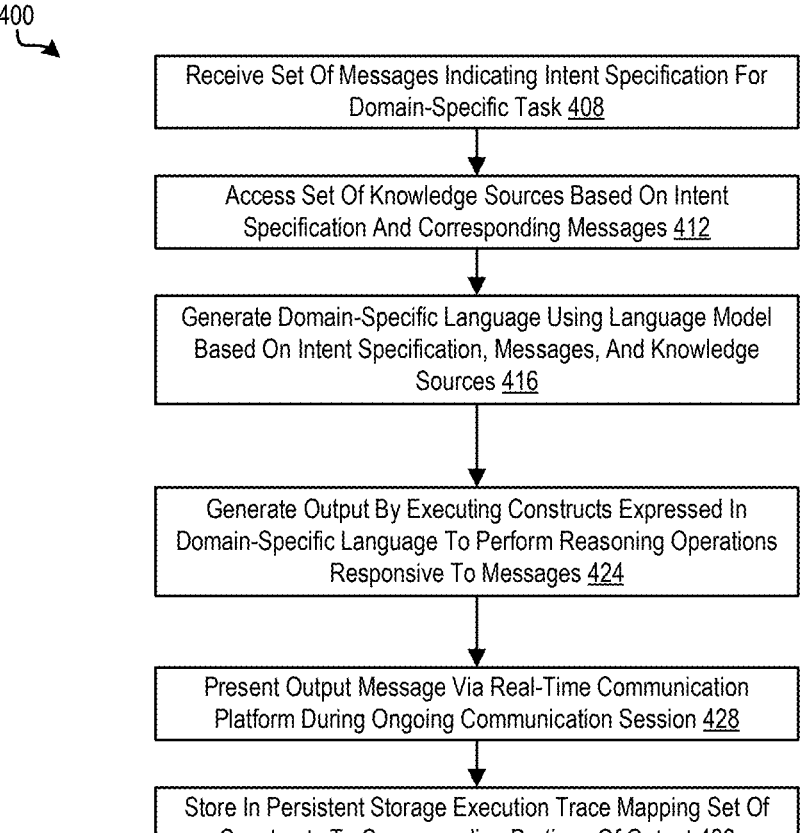

Receive Set Of Messages Indicating Intent Specification For Domain-Specific Task 408

Access Set Of Knowledge Sources Based On Intent Specification And Corresponding Messages 412

Generate Domain-Specific Language Using Language Model Based On Intent Specification, Messages, And Knowledge Sources 416

Generate Output By Executing Constructs Expressed In Domain-Specific Language To Perform Reasoning Operations Responsive To Messages 424

Present Output Message Via Real-Time Communication Platform During Ongoing Communication Session 428

Store In Persistent Storage Execution Trace Mapping Set Of Constructs To Corresponding Portions Of Output 432

*FIG. 4*

500
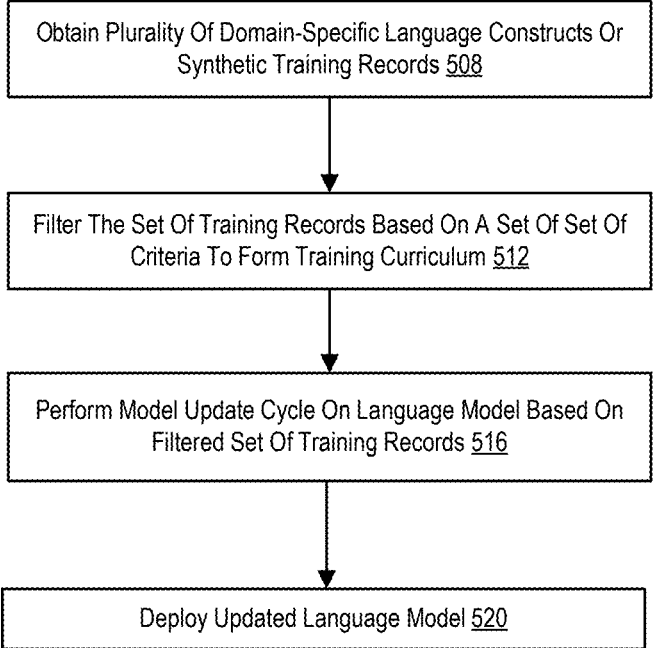
Obtain Plurality Of Domain-Specific Language Constructs Or Synthetic Training Records <u>508</u>
Filter The Set Of Training Records Based On A Set Of Set Of Criteria To Form Training Curriculum <u>512</u>
Perform Model Update Cycle On Language Model Based On Filtered Set Of Training Records <u>516</u>
Deploy Updated Language Model <u>520</u>
*FIG. 5*

DYNAMIC LANGUAGE GENERATION FOR EXPLAINABLE OUTPUTS IN CONVERSATIONAL LANGUAGE MODELS

BACKGROUND

A reasoning model is a computational framework that processes input data to generate inferences, conclusions, or decisions based on structured logic, statistical relationships, or learned patterns. Such models may be effective at handling complex problem-solving tasks, integrating diverse information sources, and adapting to new data or objectives. They excel in domains where large search spaces, nuanced decision boundaries, or multi-step inference chains are required for accurate outcomes. However, many reasoning models, such as those based on machine learning or statistical inference, may lack transparency, making it difficult for users to understand or verify how a specific conclusion was reached.

SUMMARY

A reasoning model may provide significant opportunities towards the generation of automated remediation plans in a variety of applications by applying learned patterns to derive conclusions or decisions from available information. A domain-specific language (DSL) can be used in reasoning by providing a structured, formal representation of domain concepts, relationships, and rules that can be directly executed or analyzed to produce consistent, verifiable outcomes. However, DSLs are often difficult to create and use because they require detailed domain expertise to define precise syntax and semantics, and they demand specialized tooling and training to ensure correct implementation and effective adoption.

Some embodiments may resolve such issues and other issues by dynamically generating DSL constructs based on a query or set of queries and using these DSL constructs to generate explainable decision outcomes. Some embodiments may receive a set of messages indicating an intent specification by accepting structured or semi-structured communications that describe a target computational reasoning objective. Some embodiments may access a set of knowledge sources based on the intent specification by retrieving domain-relevant datasets, ontologies, regulatory guidelines, or pre-existing DSL definitions from distributed storage or APIs. Some embodiments may generate a DSL by using a language model based on the intent specification, the set of messages, and the set of knowledge sources, wherein the DSL comprises a set of constructs defining a set of syntax rules tailored to the domain reasoning context. Some embodiments may generate an output by executing the set of constructs expressed in the DSL to perform reasoning operations responsive to the set of messages by running the constructs in a verified execution environment and producing structured results. Some embodiments may store, in persistent storage, an execution trace that indicates a mapping between the set of constructs and a set of portions of the output by recording an indexed trace log with cross-references between constructs and generated output elements. Such operations may increase the likelihood of producing verifiable, interpretable reasoning outputs, improve auditability, and reduce hallucination risks in AI-driven reasoning tasks.

By performing operations described in this disclosure, some embodiments may increase the likelihood of producing verifiable and interpretable reasoning outputs for safety-critical and regulated domains. Furthermore, some embodiments may reduce hallucination rates by constraining reasoning to formally defined and validated DSL constructs. Additionally, some embodiments may improve auditability by maintaining persistent execution traces mapping constructs to specific output elements and enhance adaptability through the ability to modify or extend the DSL based on evolving domain requirements and knowledge sources.

Various other aspects, features, and advantages of the invention will be apparent through the detailed description of the invention and the drawings attached hereto. It is also to be understood that both the foregoing general description and the following detailed description are examples and are not restrictive of the scope of the invention.

BRIEF DESCRIPTION OF THE DRAWINGS

FIG. 4 shows a flowchart of a process for dynamically generating and executing DSL constructs as intermediate reasoning representations, in accordance with one or more embodiments.

FIG. 5 shows a flowchart of a process for updating a language model trained to generate DSLs, in accordance with one or more embodiments.

Figure 1:
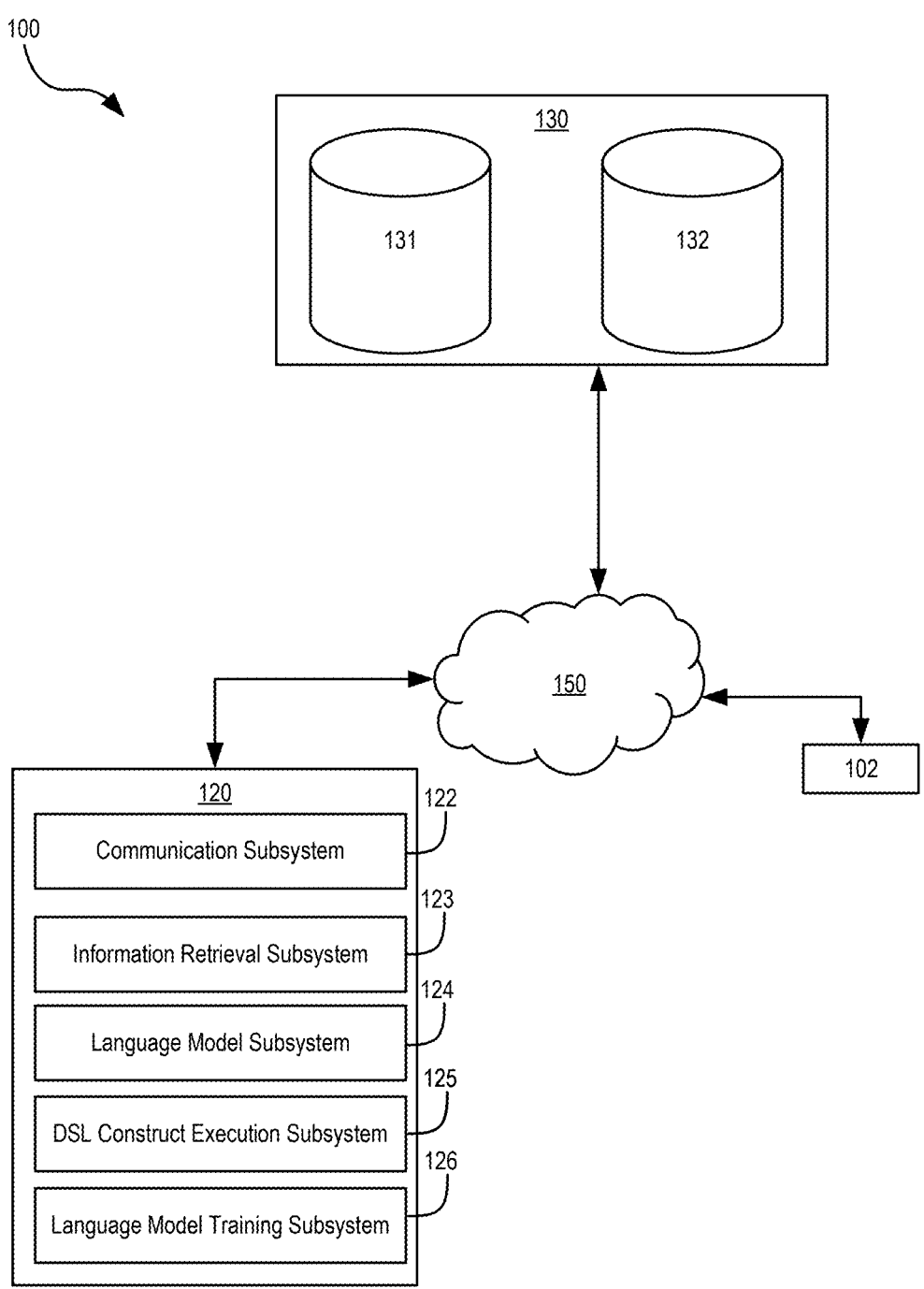
FIG. 1 shows an example system for dynamically generating and executing DSL constructs, in accordance with one or more embodiments.

The technologies described herein will become more apparent to those skilled in the art by studying the detailed description in conjunction with the drawings. Embodiments of implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Some embodiments may receive a set of messages that indicate an intent specification, where the messages convey user or system-driven requests for a specific computational or reasoning goal. For example, a computer system in a cloud-based network management environment may receive structured request messages over a secure application program interface API indicating the intent to perform automated configuration analysis for a distributed application. As described elsewhere in this disclosure, some embodiments may have mechanisms for accessing a set of knowledge sources based on the provided intent specification. Some embodiments may then generate an output by executing the constructs expressed in a domain-specific language (DSL) and store an execution trace mapping those constructs to portions of the output. By enabling a computer system to extract actionable parameters and goals from incoming communications, some embodiments may increase the likelihood of providing accurate downstream reasoning and execution operations related to domain-specific processing logic.

Some embodiments may access a set of knowledge sources according to the received intent specification to retrieve relevant data or models required for reasoning. For example, a computer system in a cloud orchestration platform may access documentation repositories, model parameter stores, and previous execution logs to retrieve data appropriate to the specified analysis task. As described elsewhere in this disclosure, some embodiments may have already received a set of messages indicating the intent specification. Some embodiments may then generate a DSL using a language model that incorporates constructs and syntax rules based on the intent and knowledge sources. Such operations may align reasoning processes with the most relevant and up-to-date contextual information, improving the accuracy and robustness of reasoning results.

Some embodiments may generate a DSL using a language model, where the language model is configured to analyze the received intent specification, the set of messages, and the retrieved knowledge sources to produce a DSL that contains constructs and syntax rules specifically tailored to the reasoning domain. For example, a computer system in an AI-assisted data analytics environment may generate a DSL for expressing statistical modeling operations, incorporating syntax rules for data preprocessing, model training, and validation based on the retrieved datasets and requested analysis type. As described elsewhere in this disclosure, some embodiments may have previously accessed relevant knowledge sources based on the intent specification. Some embodiments may further execute the generated DSL constructs to produce reasoning outputs and log execution traces mapping DSL elements to the output content. By dynamically generating the DSL based on a query or query-associated intent, some embodiments may use precise, domain-tailored reasoning processes that reduce ambiguity and improve the machine interpretability of high-level intents.

Some embodiments may generate an output by executing the constructs defined in a dynamically generated DSL, performing reasoning operations in direct response to the received set of messages. For example, a computer system implementing an automated security compliance checker in a cloud infrastructure environment may execute the generated DSL constructs to analyze system configurations, detect policy violations, and produce a compliance report. As described elsewhere in this disclosure, some embodiments may have previously generated a DSL incorporating constructs and syntax rules derived from the intent specification, messages, and knowledge sources. As described elsewhere in this disclosure, some embodiments may further store an execution trace in persistent storage indicating the mapping of DSL constructs to output portions. Such operations may produce outputs that are deterministic and explainable based on well-defined DSL execution semantics, improving traceability and debugging capabilities.

Some embodiments may store an execution trace in persistent storage, where the trace details a mapping between the generated DSL constructs and the corresponding portions of the output. For example, a computer system running a distributed AI model testing environment may log an execution trace to a cloud-based persistence layer, enabling developers to trace specific output segments back to specific constructs in the DSL execution plan. As described elsewhere in this disclosure, some embodiments may have previously generated the DSL-based reasoning output responsive to the set of messages. As described elsewhere in this disclosure, some embodiments may further incorporate retained execution traces into future reasoning operations for model or process refinement. Such operations may enable greater precision in debugging or performance analysis by retaining a reproducible record of the relationship between code constructs and generated results.

By receiving a set of messages indicating an intent specification and accessing corresponding knowledge sources, some embodiments may increase the likelihood of producing verifiable and interpretable reasoning outputs for safety-critical and regulated domains. For example, in a cloud-based financial compliance analysis system, receiving structured messages requesting ESG report validation and retrieving corresponding SEC guidelines and XBRL taxonomies enables precise selection of applicable compliance rules. By generating a DSL with constructs and syntax rules from the intent specification, messages, and knowledge sources, some embodiments may reduce hallucination rates by constraining reasoning to formally defined and validated constructs. For example, during healthcare data processing, generating a DSL with syntax rules for HIPAA-compliant field validation and then using the generated DSL when performing reasoning operations may prevent a model from producing speculative or unverifiable patient record interpretations.

By executing the generated DSL constructs responsive to the messages, some embodiments may improve auditability through persistent execution traces mapping constructs to specific output elements. For example, in a logistics optimization platform, running a generated DSL that encodes route constraints and then storing a trace mapping each route decision to DSL constructs enables later verification of route selection logic. By modifying or extending DSL constructs in connection with updated knowledge sources, some embodiments may enhance adaptability to evolving domain requirements without rebuilding an entire reasoning system. For example, when new cybersecurity policies are published, an intrusion detection DSL can be updated with new rule constructs to detect emerging attack patterns. By storing execution traces indexed to constructs and output portions, some embodiments may facilitate debugging and optimization through step-by-step replay of reasoning. For example, a developer analyzing a failed machine learning model pipeline can replay DSL-based reasoning step-by-step to pinpoint where incorrect preprocessing occurred.

By distributing tasks between generation and verification agents in a compound multi-agent system, some embodiments may improve output quality and correctness. For example, in a legal document review system, a generation agent may construct arguments in a legal DSL, while a verification agent cross-checks them against statutory references before output. By providing verification results as reinforcement signals to the language model, some embodiments may enable continuous improvement, producing increasingly accurate and compliant DSLs over time. For example, an environmental monitoring platform that flags incorrect pollution threshold calculations during verification uses those failures as negative training signals to improve future generation. By structuring DSL generation tasks in increasing complexity levels, some embodiments may progressively improve DSL capabilities through curriculum learning. For example, a manufacturing quality control system may start by generating DSL constructs for single-step inspections, then advance to multi-stage defect detection workflows. By combining the creativity of generation agents with the rigor of formal verification, some embodiments may address complex reasoning tasks requiring both inventive problem-solving and formal correctness. For example, in aerospace mission planning, a generation agent may propose fuel optimization strategies that a verification agent tests against safety parameters before mission approval.

FIG. 1 shows an example system 100 for dynamically generating and executing DSL constructs, in accordance with one or more embodiments. A system 100 includes a client device 102 in communication with a server 120 (or other computing system) via a network 150. The system 100 includes various types of electronic devices, such as the client device 102. The client device 102 may include one of various types of computer devices usable as a client-side device, such as a laptop, data terminal, mobile computing device, etc. The client device 102 may send requests, responses, or other messages to the server 120 that may require communication with other computing devices or other electronic devices. Additionally, the server 120 may include various types of computing units, such as physically separate servers, virtual nodes hosted on one or more physical machines, or nodes on a cloud computing system. Applications, services, or other operations may use data provided by the client device 102, the server 120, or a set of databases 130 that includes a first networked database 131 and a second networked database 132. The set of databases 130 may include various types of databases, such as SQL databases, noSQL databases, graph databases, etc. In some embodiments, the server 120 may perform one or more operations related to a communication and presentation subsystem 122, an information retrieval and management subsystem 123, a language model execution subsystem 124, a DSL construct execution subsystem 125, and a language model training subsystem 126.

In some embodiments, the communication and presentation subsystem 122 may obtain program instructions, commands, parameters, values, or other data from the server 120 or the set of databases 130. For example, the communication and presentation subsystem 122 may retrieve a set of parameters from the set of databases 130. Furthermore, operations performed by the server 120 may use the communication and presentation subsystem 122 to send messages to the set of databases 130, the server 120, or another computing device described in this disclosure. Furthermore, some embodiments may use the communication and presentation subsystem 122 to communicate with one or more remote computing devices to offload some or all of the operations described in this disclosure.

In some embodiments, the communication and presentation subsystem 122 may deliver a generated output message to participants via the real-time communication platform during an active communication session. The communication and presentation subsystem 122 may receive the structured output, including any reasoning results, compliance determinations, or recommendations, from upstream components such as the DSL construct execution subsystem 125. The communication and presentation subsystem 122 may format the output into a presentation-ready structure compatible with the communication channel in use, which may include live video call overlays, in-chat text responses, shared document annotations, or interactive dashboard elements. The communication and presentation subsystem 122 may increase the likelihood that a presentation occurs within the real-time constraints of the session, possibly utilizing a streaming content delivery mechanism to render partial results as they are generated.

In some embodiments, the communication and presentation subsystem 122 may first transform the structured output into a multimodal presentation layer that may combine text narratives, visual indicators, tables, or charts derived from the reasoning process. The communication and presentation subsystem 122 may apply formatting templates that are optimized for the specific communication medium—such as markdown, hypertext markup language (HTML), or slide-based visual layouts—while embedding semantic markers that allow recipients to interact with or request further detail on specific parts of the output. The communication and presentation subsystem 122 may also integrate adaptive response timing, whereby highly critical reasoning results are immediately flagged and pushed to participants, while supplementary details are batched to avoid overwhelming the communication feed. Additionally, the communication and presentation subsystem 122 may log output messages for archiving in coordination with the information retrieval and management subsystem 123, ensuring traceability between the communicated results and their provenance within the reasoning process.

For example, in a disaster response coordination meeting conducted via a secure video conferencing platform, the communication and presentation subsystem 122 may present an output message generated by the DSL construct execution subsystem 125 that outlines optimal evacuation routes based on live sensor feeds and GIS data. This output may be rendered as both an annotated map overlay on the shared screen and a textual summary in the meeting chat. The subsystem may deliver the most urgent evacuation advisories immediately, using color-coded route highlights, while the extended reasoning details and supporting data sources are provided in a collapsible sidebar view that participants may request on demand. The communication and presentation subsystem 122 may further generate audio messages based on generated text and send audio data reciting the audio messages to one or more client devices.

In some embodiments, the information retrieval and management subsystem 123 may obtain domain-specific terms and retrieve relevant knowledge data used for DSL construction. The information retrieval and management subsystem 123 may obtain initial input from an application program interface (API), e-mail, message platform, or other communication platform and, based on the initial input, determine what documents or other knowledge to retrieve.

In some embodiments, the information retrieval and management subsystem 123 may establish a secure data channel with the real-time communication platform to stream incoming messages in near real-time. These messages may include multimodal data such as transcribed speech, structured forms, uploaded documents, sensor readings, and embedded metadata tags. The information retrieval and management subsystem 123 may apply pre-processing operations that may include language detection, part-of-speech tagging, entity recognition, and domain keyword extraction. This pre-processing pipeline may additionally segment the communication stream into discrete semantic chunks based on conversational turns or detected topic boundaries. Each segmented portion may be assigned a unique identifier and timestamp, which may allow for accurate contextual reconstruction in downstream processing. Once pre-processing is completed, the information retrieval and management subsystem 123 may enqueue the segmented messages into a message broker or event stream that may interface with the system's multi-agent analysis layer.

In some embodiments, the downstream multi-agent analysis layer may employ an information analysis agent to extract domain-specific terms and formalize structured assertions from the segmented message payloads. These assertions may be represented in an intermediate formalism that may allow for unambiguous interpretation by a pattern recognition agent, which may identify constraints, rules, and relationships embedded in the conversation. A DSL synthesis agent may then use these constraints to construct a computational intent specification, which may define the workflow logic, permissible operations, and goal states for the given domain. The information retrieval and management subsystem 123 may capture and normalize an input message, which may increase the likelihood of producing a complete and logically sound computational intent specification. Some embodiments may use the computational intent specification to query a knowledge source layer, which may include indexed repositories, graph-based ontologies, regulatory guidelines, and domain-specific APIs. Relevant resources may be integrated into the DSL, allowing for both symbolic execution and formal verification of the intended reasoning.

For example, in a climate risk analysis context, the information retrieval and management subsystem 123 may receive a set of messages from a multi-participant meeting between environmental scientists and city planners, containing references to weather sensor network data, historical flood maps, and municipal zoning regulations. The information retrieval and management subsystem 123 may pre-process and segment the data, isolating sections describing hydrological models, risk thresholds, and planned urban development projects. The analysis layer may then formalize these into assertions that define relationships between rainfall events, water retention capacities, and evacuation protocols. A DSL synthesis agent may encode these relationships into a computational intent specification for simulating flood scenarios under varying climate projections. A structured output of the information retrieval and management subsystem 123 may allow the DSL to access hydrological databases, legal compliance datasets, and predictive climate models, enabling rigorous simulation runs and generating an evidence-backed risk mitigation plan.

In some embodiments, the language model execution subsystem 124 may operate as a generative processing core responsible for producing a DSL that is tailored to one or more computational intent specifications. The language model execution subsystem 124 may ingest the computational intent specification derived from prior analysis steps, the originally received set of messages, and the relevant set of knowledge sources. The language model execution subsystem 124 may utilize a generative language model that has been fine-tuned to identify domain-specific entities, relationships, and operational constraints, and to express these elements in a formal grammar. The generated DSL may comprise a set of constructs that define explicit syntax rules, including allowable compositions of named entities and their relationships as extracted from the set of knowledge sources. The subsystem may operate in both creative and rule-bound capacities by allowing the generative model to hypothesize potential constructs while simultaneously applying a constraint engine to eliminate non-compliant or semantically invalid syntax. As the DSL is generated, the language model execution subsystem 124 may maintain a symbol table of domain entities and a relationship map to guide semantic correctness across the constructs.

In some embodiments, the language model execution subsystem 124 may parse a computational intent specification to identify high-level goals and domain constraints. This mapping may be followed by a decomposition pipeline where the generative language model produces hierarchical structural elements such as base entity types, relationship schemas, and permissible transformations. The subsystem may cross-reference constructs against the set of knowledge sources to verify entity naming consistency, validate rule applicability, and ensure alignment with formal domain ontologies. The generated syntax rules may be expressed in Backus-Naur Form (BNF) or an equivalent formal representation, enabling downstream verification subsystems to apply syntax and semantic checks. The language model execution subsystem 124 may also employ probabilistic scoring mechanisms that prioritize construct selections which maximize completeness, clarity, and execution feasibility. This bidirectional process of generative creativity and formal constraint application may increase the likelihood that the resulting DSL is both executable and verifiable by the system's verification engine.

For example, in the case of financial regulatory compliance, the language model execution subsystem 124 may receive a computational intent specification indicating that the task is to analyze and validate climate risk disclosures within corporate regulatory filings according to updated disclosure standards. The set of messages may include user-provided instructions, excerpts from the filings, and structured metadata tags specifying disclosure sections. The set of knowledge sources may include previously defined XBRL-based taxonomies, climate risk disclosure regulations, and corporate governance ontologies. The language model execution subsystem 124 may utilize these inputs to generate an extended DSL that incorporates new named entities such as "climate strategy description" and "governance control framework," new relationship constructs such as "is_compliant_with," and rules defining allowable compositions between corporate entities and climate-related data points. This DSL may then define syntax rules that permit only valid mappings between financial reporting sections and verified compliance indicators, enabling downstream execution and verification subsystems to run automated, reproducible regulatory compliance checks.

In some embodiments, the DSL construct execution subsystem 125 may function as the runtime environment that is specifically designed to interpret and execute the set of constructs expressed in the DSL. The DSL construct execution subsystem 125 may receive the fully generated and verified DSL constructs, along with contextual data derived from the set of messages and may initiate an execution pipeline that applies the DSL-defined syntax rules, entity relationships, and operational logic to perform reasoning operations. The DSL construct execution subsystem 125 may include an interpreter or compiler that transforms the DSL constructs into executable instructions, a runtime reasoning engine that applies the defined logic to the relevant input data, and an execution state manager that tracks variable bindings, temporal conditions, and intermediate results across the reasoning process. The subsystem may be capable of both deterministic execution, where operations follow exact syntax and semantic mappings, and conditional execution, where specific branches may be taken based on the evaluation of DSL-defined constraints.

As used in this disclosure, a DSL may include a domain-specific language with defined syntax and semantics tailored to a particular application domain and may include at least one construct that represents a fundamental operation, entity, or rule within that domain. Furthermore, a DSL construct may include a command, expression, or rule representing a domain-specific action or entity. Some embodiments may use DSL constructs to perform operations or define logic executable within a domain corresponding to a DSL.

In some embodiments, the DSL construct execution subsystem 125 may load the DSL into a controlled execution environment that includes domain-specific data access interfaces, computational reasoning modules, and logging utilities. Once the execution begins, the subsystem may retrieve relevant data streams or records that the DSL references, such as knowledge source outputs or the parsed and segmented contents from the messages. Execution may then proceed through a sequence of DSL-defined operations, which may include rule application, relationship inference, compliance evaluation, simulation procedures, or statistical aggregation. During execution, the DSL construct execution subsystem 125 may generate intermediate reasoning artifacts, apply verification or constraint checks in real-time to prevent invalid state progression, and adapt the execution flow based on conditional logic embedded within the DSL constructs. Once the operations are completed, the subsystem may produce a structured output that encapsulates the results of the reasoning process, complete with any generated insights, compliance determinations, or recommended actions. This output may then be formatted for delivery to downstream systems, user interfaces, or reporting tools.

For example, in a healthcare treatment planning scenario, the DSL construct execution subsystem 125 may receive verified DSL constructs that define a planning framework based on patient condition, medical guidelines, and available therapeutic options. The set of messages may include structured patient history data, clinician notes, and diagnostic imaging results, while the DSL may define constructs specifying allowable composition of treatment entities, dosage relationships, and rule-driven exclusion criteria. The DSL construct execution subsystem 125 may execute these constructs by extracting patient-specific variables, matching them to treatment eligibility rules, inferring potential risks, and recommending optimized treatment plans based on clinical pathway definitions encoded in the DSL. The execution process may produce an output containing a ranked set of treatment plans, each annotated with supporting rationale derived from the DSL's reasoning chain, enabling accurate, explainable, and verifiable medical decision-making.

In some embodiments, the language model training subsystem 126 may update a generative language model based on retrieved or synthesized training data. This subsystem may receive curated examples, failure case traces, and verified DSL instances from upstream components such as the information retrieval and management subsystem 123 and the verification system. The language model training subsystem 126 may preprocess the training data to align it with the model's expected input-output formats, augment it with metadata indicating domain relevance and context, and apply filtering mechanisms to remove low-quality or noisy examples. The subsystem may then initiate a fine-tuning process, applying optimization algorithms to adjust the language model's parameters so that future DSL generation aligns more closely with domain rules, produces syntactically correct constructs, and improves reasoning accuracy.

In some embodiments, the language model training subsystem 126 may organize incoming training data into multiple categories, including verified positive examples, annotated negative examples derived from failed verification attempts, and synthetic examples generated to expand coverage of underrepresented reasoning scenarios. The subsystem may use domain-specific curriculum learning strategies, introducing the language model to increasingly complex constructs over time. Additionally, the subsystem may employ a reward-based optimization loop, where DSL constructs passing verification receive greater reinforcement scores and are prioritized in parameter updates. The training process may occur either in an offline batch mode, where large volumes of historical training data are processed at once, or in an online incremental mode, where the model is updated continually as new data arrives. Model performance may be periodically validated against a benchmark suite of DSL generation tasks, with metrics on syntax adherence, semantic validity, and reasoning fidelity tracked over successive iterations.

For example, in an autonomous regulatory compliance monitoring system, the language model training subsystem 126 may receive execution traces and verification results indicating that the language model previously generated DSL constructs with incomplete mappings for newly introduced climate risk disclosure categories. The information retrieval and management subsystem 123 may provide relevant historical outputs, while a synthetic data generation module may produce additional examples of compliant and non-compliant disclosure structures. The language model training subsystem 126 may integrate these examples into an augmented training dataset and perform a fine-tuning session that prioritizes accurate entity-relationship representations for the new disclosure categories. After training, the updated model may demonstrate improved accuracy in generating DSL constructs that meet updated regulatory criteria, increasing the likelihood of producing outputs that pass verification in future compliance analyses.

Figure 2:
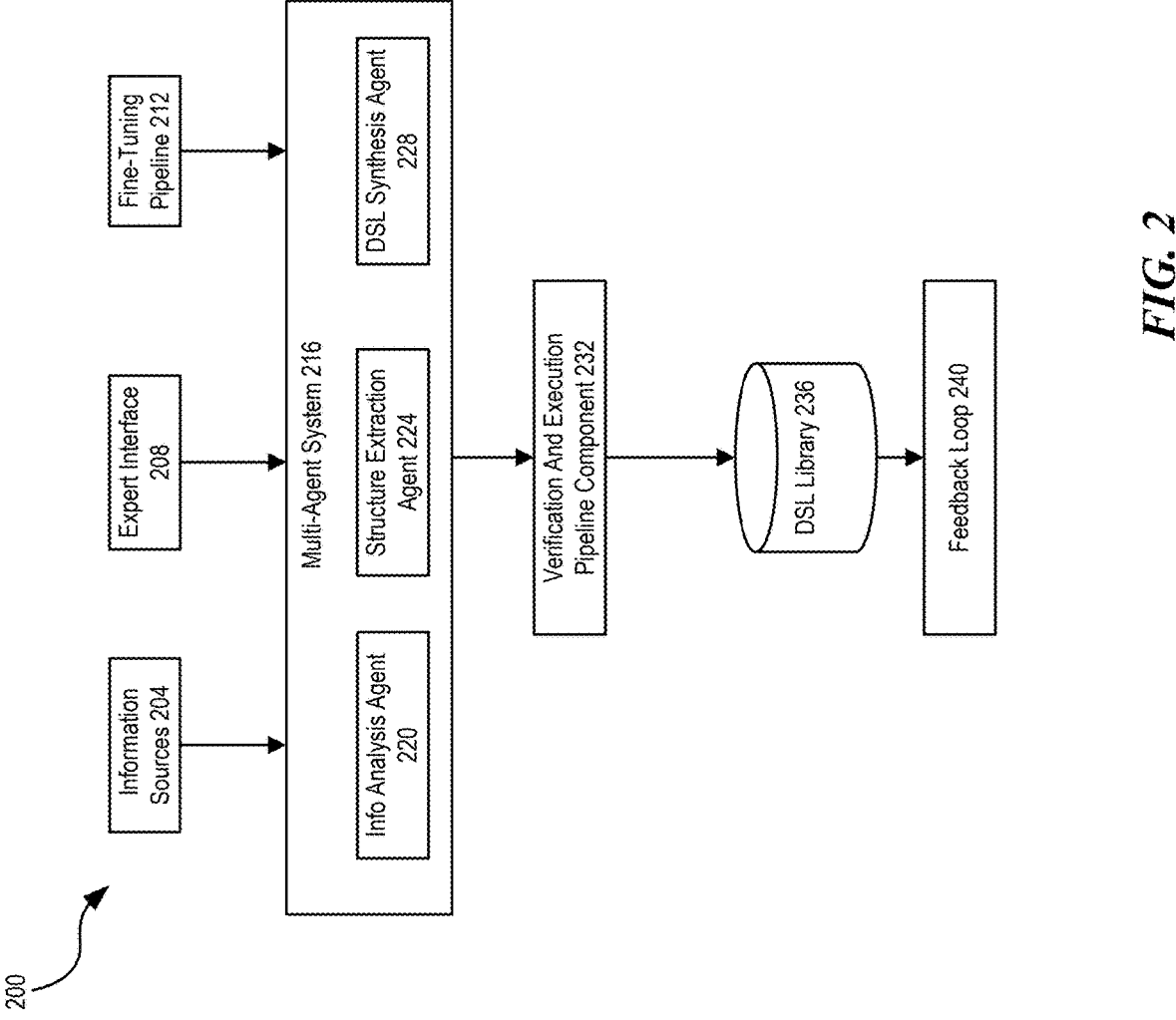
FIG. 2 shows a conceptual architecture of a system for a multi-agent framework that dynamically generates and executes DSL constructs as intermediate reasoning representations, in accordance with one or more embodiments.

FIG. 2 shows a conceptual architecture 200 of a system for a multi-agent framework that dynamically generates and executes DSL constructs as intermediate reasoning representations, in accordance with one or more embodiments. In some embodiments, an information sources component 204 may acquire heterogeneous inputs from multiple external repositories. Such inputs may include, by way of non-limiting example, documents in machine-readable formats such as XML or JSON, relational database records retrieved via SQL queries, natural language regulatory materials in text or PDF format, streamed sensor data, or unstructured web content from the internet. The information sources component 204 may preprocess acquired material to normalize data formats, tokenize text, extract metadata, or perform other preparatory analysis before forwarding the results to downstream processing.

An expert interface 208 may operate in parallel to provide a collaborative interface that allows subject matter experts, machine learning systems, or external decision systems to supply task definitions, domain constraints, or refinements to logic. In some cases, the human experts component may be implemented as a web-based dashboard through which experts can view proposed DSL constructs, provide annotations, accept or reject candidate logic, or modify parameter values. The refined inputs from the expert interface 208 may be merged with the content from the information sources component for coordinated analysis.

In some embodiments, a fine-tuning pipeline component 212 may supply inputs to downstream reasoning processes. The fine-tuning pipeline component 212 generates updated models and synthetic training data, which may be created, for example, by mutating existing DSL constructs, paraphrasing task statements, or generating domain-specific test cases. The fine-tuning pipeline component 212 may incorporate reinforcement learning reward signals derived from verification results, ensuring that model updates are guided by actual correctness and performance outcomes. Outputs of the fine-tuning pipeline component 212 may be transmitted to a multi-agent system component 216.

The multi-agent system component 216 may include multiple specialized large language model agents that collaborate to transform incoming information into formally verified, executable DSLs. Within the multi-agent system component 216, an information analysis agent component 220 parses and interprets the combined inputs to identify task-specific informational elements such as constraints, relationships, or dependencies. A structure extraction agent component 224 then formalizes these elements into machine-interpretable structures. Non-limiting examples of such structures include abstract syntax trees (ASTs), directed acyclic graphs, logic propositions in first-order logic, or other symbolic representations. These structures are then provided to a DSL synthesis agent component 228, which generates complete DSL constructs, for example, using a grammar defined in extended BNF or another parseable format suitable for formal verification.

Some embodiments may pass the generated DSL constructs from the multi-agent system component 216 to a verification and execution pipeline component 232. The verification and execution pipeline component 232 may perform syntactic or semantic verification, which, in various embodiments, may include grammar conformance checks, static analysis to prevent unsafe operations, simulation runs against known scenarios, or theorem proving to confirm constraint adherence. Constructs that pass verification are executed in an appropriate runtime, such as a dedicated interpreter or a sandboxed execution environment, depending on the domain and application.

Following successful execution, the verified DSL constructs are stored in a DSL library component 236. The DSL library component maintains each construct along with associated metadata—such as its originating task description, verification history, and performance metrics, which may result in a reusable repository that can be queried and leveraged for future tasks without requiring recreation from scratch. In some embodiments, the DSL library component 236 may act as a DSL library repository that is configured to store a plurality of verified DSLs, each represented in a structured, machine-readable form that captures its grammar, production rules, semantic constraints, and allowable compositions of entities within its target domain. Each DSL entry in the repository is associated with domain metadata describing the application area (e.g., finance, healthcare, manufacturing) and task metadata describing the specific operational goals or functions for which the DSL was originally created. Additional metadata may include version history, dependency references, prior usage statistics, performance scores, and formal verification results, enabling effective management, indexing, and retrieval of the stored DSL artifacts. The repository may also maintain embedding-based vector representations of the DSLs and their metadata to support semantic search.

Results from the verification and execution pipeline component are also sent to a feedback loop component 240. The feedback loop component transforms these results into reward signals, which are returned to the fine-tuning pipeline component to improve the models within the multi-agent system component 216. In some embodiments, the feedback loop component may also identify common error patterns, trigger targeted retraining on problematic cases, or adjust the weight assigned to outputs from different agent roles, thereby enhancing the robustness and adaptive capabilities of the system.

Figure 3:
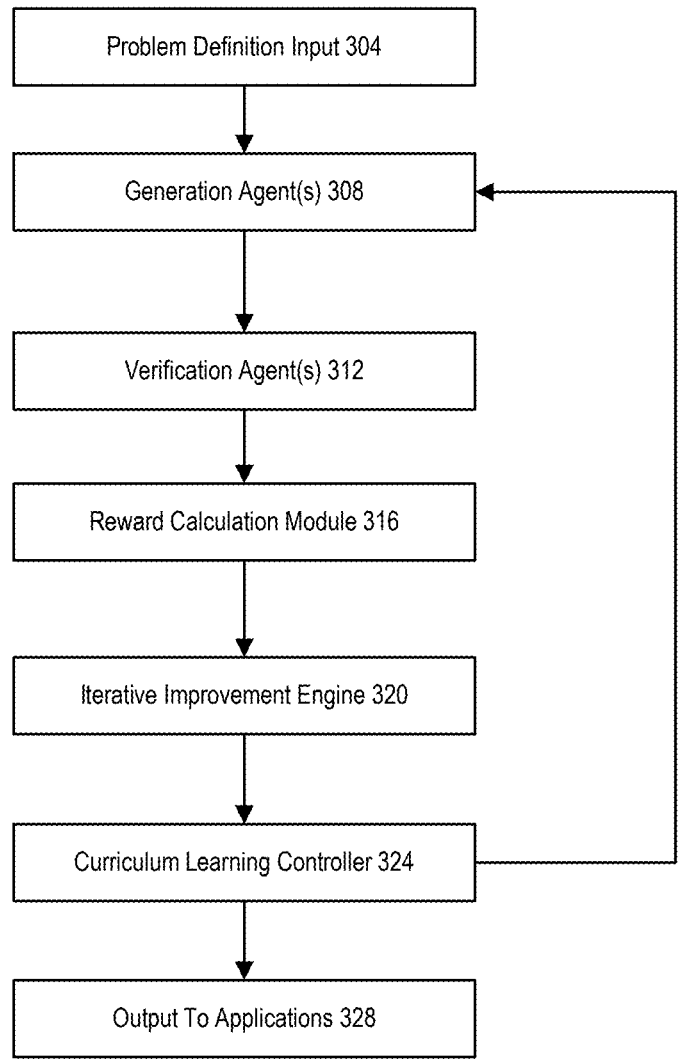
FIG. 3 shows a compound system architecture for verifying and updating DSL-generating language models, in accordance with one or more embodiments.

FIG. 3 shows a compound system architecture for verifying and updating DSL-generating language models, in accordance with one or more embodiments. In some embodiments, a problem definition input component 304 may receive a specification of a task to be performed, which may be provided by a human user, another software system, or an automated problem-selection module. The task specification may include, by way of non-limiting example, a natural language description of a regulatory compliance scenario, a mathematical theorem to be proven, an engineering specification to be met, or other domain-specific objectives. The problem definition input component 304 may perform preliminary parsing or encoding of the specification into a structured form suitable for handling by downstream agents.

The processed problem definition is passed to a generation agent component 308. The generation agent component 308 is configured to create one or more candidate solutions to the problem, which may include, for example, domain-specific language constructs as described in FIG. 1, formal proofs, logical argument structures, symbolic plans, or executable workflows. In some embodiments, the generation agent component 308 may itself include multiple sub-agents, each specialized in a certain problem domain or type of output. The generation agent component 308 transmits the generated candidates to a verification agent component 312.

The verification agent component 312 performs formal evaluation of the candidate solutions produced by the generation agent component 308. Depending on the problem type, the verification agent component 312 may carry out syntax and semantics checks against a defined grammar, type and constraint checking, simulation runs against known inputs and expected outputs, or mathematical proof validation using a theorem prover. In some embodiments, the verification agent component 312 may also execute candidates in a controlled runtime environment to detect undesired behaviors or performance failures. Verification results are then passed to a reward calculation component 316.

The reward calculation component 316 determines a reward or penalty score based on the verification results. The calculation may consider binary pass/fail status, graded correctness scores, coverage of required conditions, computational efficiency, or adherence to non-functional requirements such as safety margins. In some embodiments, the reward calculation component 316 may output a composite score derived from multiple weighted criteria. The reward data is passed to an iterative improvement engine 320.

The iterative improvement engine 320 uses the reward data to adjust the operation of the generation agent component 308. Adjustments may include updating internal model parameters of a large language model used in generation, altering prompt templates or task decomposition strategies, or modifying search heuristics and exploration-exploitation balances. In certain embodiments, updates may be applied via reinforcement learning algorithms such as policy gradient methods, Q-learning, or evolutionary optimization. The iterative improvement engine 320 provides a direct feedback loop back to the generation agent component 308, enabling the system to re-generate improved candidate solutions informed by prior verification outcomes without needing to restart from scratch. This loop allows for continuous optimization during a problem-solving session.

While the iterative improvement engine 320 focuses on immediate feedback-driven refinement, a curriculum learning controller 324 may manage the longer-term progression of tasks and complexity levels addressed by the system. The curriculum learning controller 324 may, for example, begin with simplified problem instances or domain-specific language constructs, then gradually introduce multi-stage tasks, cross-domain reasoning, or advanced constraint sets as system competence increases. The curriculum learning controller 324 may receive performance data from the iterative improvement engine 320 and adjust the difficulty or domain coverage of subsequent problems accordingly.

Once a candidate solution has passed verification under the current curriculum conditions, it is delivered to an output to applications component 328. The output to applications component 328 makes the verified solution available for deployment within external systems, integration into larger workflows, or presentation to end users. In some embodiments, the output to applications component 328 may also store successful solutions in a persistent repository or knowledge base for future retrieval and reuse.

FIG. 4 shows a flowchart of a process 400 for dynamically generating and executing DSL constructs as intermediate reasoning representations, in accordance with one or more embodiments. Some embodiments may receive a set of messages indicating an intent specification for a domain-specific task, as indicated by block 408. Some embodiments may receive a set of messages indicating an intent specification by performing intake and analysis operations to identify domain-specific context, operational requirements, and functional parameters. The messages may originate from a variety of sources, such as external systems, requestors, automated triggers, or real-time communication inputs. The processing may involve modules such as an Information Analysis Module configured to extract structured data, operational rules, procedural steps, and constraints from the received content. The extracted elements may then contribute toward forming a computational representation or DSL construct that captures the intent specification. This approach may increase the likelihood of accurately identifying and formalizing the intended operations described in this disclosure.

A computer system may receive, over a communication channel of a real-time communication platform, a set of textual inputs that collectively describe a computational request. The computer system may use a processor-implemented Information Analysis Module to parse the messages for semantic meaning, detect relevant operational requirements, and codify constraints relevant to the computational intent. The computer system may then employ a Pattern Recognition Agent to interpret recurring structures within the message content, enabling the derivation of a reproducible and verifiable computational intent specification. This specification may subsequently be formalized as part of a DSL construct within a DSL Synthesis Agent, increasing the likelihood of alignment between the communicated intent and the operations performed in response.

Some embodiments may access a set of knowledge sources based on the intent specification and the corresponding messages, as indicated by block 412. Some embodiments may generate a DSL by using a generative language model based on an intent specification, a set of messages, and a set of knowledge sources. The intent specification may express a goal, target outcome, or analytical purpose inferred from structured, semi-structured, or unstructured content. Possible forms of the intent specification may include a structured data object such as JavaScript Object Notation (JSON) or Extensible Markup Language (XML), a free-text description of a problem, or a sequence of symbolic statements. The set of messages may contain natural language dialogues, structured task directives, or other instruction formats that establish parameters or constraints to be reflected in the DSL. The set of knowledge sources may include relational databases, document repositories, standards and regulations, application programming interfaces, ontologies, or graph-based datasets that contain factual or procedural information relevant to the intent specification.

As a possible approach, the process may begin by preprocessing the set of messages and the set of knowledge sources into a unified intermediate representation. This preprocessing may involve tokenizing text, segmenting sentences, tagging parts of speech, parsing dependencies, performing named entity recognition, or converting tabular and graph data into a standardized triple form such as the Resource Description Framework. The intent specification may be converted into an embedding vector using a sentence-transformer or other semantic embedding method, which may then be applied to measure similarity against content retrieved from the set of knowledge sources. Data schema inference techniques may be applied to derive candidate entity types and the permissible relationships observed across the set of knowledge sources.

A generative language model may be prompted or otherwise provided with structured context elements that include the processed intent specification, extracted entities and relationships derived from the set of knowledge sources, and discovered patterns or rule structures present in the set of knowledge sources. The generative language model may produce draft DSL definitions by representing them in a formal grammar such as Extended Backus-Naur Form (EBNF), a context-free grammar definition, or an abstract syntax tree (AST). Within these grammar outputs, constructs may include entity type definitions, attribute declarations, relationship mapping rules, conditional execution blocks, iteration patterns, data transformation rules, validation constraints, and procedural templates. Each construct may have corresponding syntax rules that specify valid combinations and permissible sequences, such as a relationship type that can only join specific entity types, a validation rule that must be applied prior to a transformation operation, or an initialization block that must precede certain actions.

A generated DSL may undergo validation to confirm its well-formedness and to verify consistency between its constructs and the information contained in the set of knowledge sources. This validation may include grammar parsing, type checking, constraint satisfiability analysis, and semantic verification against extracted knowledge. Feedback from validation may be used to refine the prompts or update the training set, increasing the likelihood that the generated DSL properly reflects the intent specification. A final DSL may be stored in a repository that supports version control, semantic search, and retrieval, allowing reuse for similar tasks or adaptation to different but related operational contexts.

For example, an intent specification of analyzing safety compliance in equipment maintenance logs may result in constructs such as "Maintenance_Record," "Inspection_Result," "Compliance_Threshold," and "Safety_Violation_Flag," paired with syntax rules that trigger violation flags only when inspection results fall below compliance thresholds present in the set of knowledge sources. An intent of generating cross-border tax liability summaries for multinational transactions may yield constructs such as "Transaction_Record," "Jurisdiction_Rule," and "Tax_Computation_ Block," with syntax rules that require pairing jurisdiction-specific rules from the set of knowledge sources with the associated transactions. A further example may involve monitoring supply chain resilience during natural disasters, producing constructs such as "Supply_Node," "Disruption_ Event," "Alternate_Route," and "Resilience_Score," with syntax rules preventing the assignment of an alternate route until a disruption event has been identified within the set of knowledge sources. These examples illustrate possible outcomes of combining an intent specification, a set of messages, and a set of knowledge sources within the described process.

Some embodiments may generate a DSL using a language model based on the intent specification, the messages, and the knowledge sources, as indicated by block 416. Some embodiments may generate a DSL by using a language model based on the intent specification, the set of messages, and the set of knowledge sources, wherein the DSL comprises a set of constructs defining a set of syntax rules. The generation process may, in some examples, transform information from the intent specification into structured prompts or control sequences for a generative language model. The generative language model may then output initial definitions for the set of constructs and the set of syntax rules. The set of constructs may be represented in various forms, such as formal grammar productions, object definitions, symbolic instructions, or configuration entries. The set of syntax rules may be expressed in formats such as EBNF, Parsing Expression Grammar (PEG), constraint satisfaction rules, or ontology axioms to specify allowable compositions and arrangements among constructs. These syntax definitions may be stored and applied in parsing components, constraint checkers, or semantic validators for later use in reasoning operations.

In certain possible implementations, the system may extract named entities and relationships from the set of knowledge sources using named entity recognition models, dependency parsers, regular expression matching, or pattern-based extractors. The extracted information may provide the core elements for the set of constructs, while relationship patterns and operational constraints found in the data may inform the set of syntax rules. The language model may generate DSL candidate text or code which may then be parsed into an AST, serialized grammar file, or other intermediate representation. This representation may be validated through syntactic parsers, semantic verification tools, satisfiability solvers, or type checkers to detect inconsistencies or invalid compositions before storage or execution.

As described elsewhere in this disclosure, the generated DSL may be stored in a repository or database that supports version control and metadata indexing. In such an arrangement, the set of constructs and the set of syntax rules may be stored alongside identifiers, provenance information, compatibility notes, and usage statistics. Storage formats may vary, in some embodiments, from plain text grammar files to structured formats such as JSON Schema, XML, RDF, or a domain-neutral intermediate representation, all capable of expressing the constructs and their governing syntax rules. Indexing mechanisms may allow subsequent retrieval of the DSL by domain, by the constructs it defines, or by compliance to a known syntax rule set.

For example, in a financial reporting context, the generative language model may produce a set of constructs such as IdentifyDisclosure, LinkMitigation, and ComputeRisk-Score. The corresponding set of syntax rules may specify that IdentifyDisclosure must target an entity classified as a disclosure type, LinkMitigation can only be used after a high-risk disclosure has been identified, and ComputeRisk-Score must incorporate both disclosure and mitigation entities within the same scope. The constructs and syntax rules could be exported as a grammar in EBNF, a JSON Schema, or another format suitable for integration with a compliance-checking engine.

In another example, for biomedical research synthesis, the set of constructs might include ExtractCompound, AssociateTarget, and SummarizeTrialResult. The set of syntax rules could state that AssociateTarget is only valid for compounds appearing in the trial outcome data, and that SummarizeTrialResult must follow at least one association between compound and target. This DSL could be captured in a graph structure where nodes represent constructs and edges represent allowable relationships as defined by the syntax rules. In either case, the storage and syntax definitions may take multiple forms, and the processes by which the set of constructs and set of syntax rules are generated, validated, stored, and reused may vary depending on system architecture, available language model capabilities, and domain-specific requirements.

In some embodiments, the system incorporates existing DSLs from a persistent knowledge repository as a warm-start mechanism. Previously generated DSL constructs, including their syntactic, semantic, and operational characteristics, can be stored in a structured DSL library to accelerate the generation of new DSLs for related operational tasks or evolving domain requirements. The repository can maintain, for each stored DSL construct, a serialized representation of its grammar (e.g., in a machine-readable notation such as an AST or BNF), a description of its semantic rules in logical or constraint form, and associated metadata such as domain classification, creation date, version identifier, dependency references, prior performance metrics, and usage history.

For retrieval and reuse, the system computes and stores embedding or other vector representations of each DSL construct to enable semantic similarity search. An embedding of a DSL construct may include any numerical or symbolic representation derived from the construct, including but not limited to text embeddings, graph embeddings, or structured encodings. In some embodiments, a DSL construct may be parsed into an AST or other hierarchical representation, which is then encoded into an embedding by a neural network, graph encoder, or symbolic embedding function. Such embeddings may be used for semantic similarity search within the DSL library. The embedding can include a composite vector representation formed by concatenating or otherwise combining the embedding of the task specification with the embedding of associated domain metadata and the embedding of relevant DSL constructs. Such operations can capture both the contextual requirements and the structural-semantic characteristics of candidate DSLs in a unified similarity search space.

The embedding generation process can extract feature sets from the DSL's structural definition, including the set of production rules; symbol and token distributions; semantic constraints; and inter-entity relationship graphs. These features can be flattened or serialized into a normalized token sequence, which is then transformed into a fixed-dimensional continuous vector using an embedding model trained or fine-tuned to preserve semantic and structural proximity between functionally related DSLs. The embedding vectors are stored alongside the DSL's symbolic representation and metadata in the repository, indexed in a vector-searchable data structure capable of returning nearest-neighbor matches according to a similarity metric such as cosine similarity, dot-product similarity, or Euclidean distance.

Upon receiving a new task specification, the system derives a structured representation of the task context. This can involve natural language parsing of the request, extraction of domain-specific entities and relationships, and normalization into a canonical task-feature format. The same embedding generation process used for DSLs is applied to this task-context representation, producing a query vector. The vector search component of the repository computes similarity scores between the task query vector and the stored DSL embeddings, retrieving a ranked list of candidate DSLs whose structural and semantic embeddings are most similar to the task requirements.

In some embodiments, a computer system includes a retrieval module configured to support semantic querying of stored DSLs in a repository through multiple query modalities. In operation, the retrieval module can respond to a new task or domain specification by performing domain and sub-task identification (e.g., decomposing a complex request into smaller procedural steps or context elements). Both the overall task description and the identified sub-tasks or domain contexts can then be transformed into embedding vectors that encode their contextual, semantic, and structural features. In addition, a pre-existing DSL construct can be embedded to capture its syntactic and semantic patterns. The retrieval process can operate on a task/domain embedding, a DSL embedding, or a composite embedding that combines them. A similarity search mechanism then compares these embeddings to stored DSL embeddings and rankings in the repository, returning a set of candidate DSLs whose vector representations-structures, semantics, or past usage contexts-most closely match the query according to a defined similarity metric. The retrieval module can further merge results from multiple query modes, including domain-only queries, task-only queries, DSL-to-DSL similarity queries, and composite queries, thereby enabling the system to locate relevant DSLs based solely on high-level functional descriptions, by structural equivalence to an existing DSL, by prior usage similarity, or by jointly considering both task/domain requirements and known DSL structures.

The highest-ranked DSL candidates are then evaluated through an adaptation process. Adaptation may involve extending an existing grammar with new production rules, altering semantic constraints to meet updated standards, or introducing new domain concepts. For example, an existing financial reporting DSL can be extended to include new constructs representing environmental or climate-risk disclosures by inserting new grammar symbols and defining logical constraints that govern their allowed relationships. This adaptation process can be guided by transformation rules derived from domain experts, by pattern mining from related DSLs, or by automated grammar-merge algorithms. Once the adapted DSL is generated, it can be subjected to a formal verification process, which may include static analysis of the grammar to detect ambiguities, validation of semantic constraints against domain rules, and automated theorem-proving for safety or correctness properties.

Verified DSLs are stored back into the repository as new entries with updated metadata and a newly computed embedding vector to reflect their evolved structure and semantics. This ensures that future task specifications with related requirements can retrieve the adapted DSL rapidly, rather than constructing it from first principles. Over time, this warm-start mechanism allows the system to accumulate a rich, vector-searchable knowledge base of tested, domain-specific languages, enabling both high retrieval precision and efficiency in DSL adaptation for emerging application needs.

In some embodiments, a computer system includes a generation agent configured to receive retrieved DSLs (e.g., DSLs retrieved using a retrieval module) and synthesize a new DSL by extending, modifying, or merging them. Extension operations may include adding new grammar productions, symbols, semantic constraints, or domain entities; modification can involve altering existing rules, renaming or removing constructs, or adjusting constraints to meet updated requirements; merging can unify non-conflicting grammar structures from multiple DSLs into a single integrated construct. The generation agent can employ deterministic transformation rules, grammar-composition algorithms, or machine learning-based synthesis models while ensuring that the output DSL is complete and internally consistent. Once generated, the new DSL is subjected to a verification process, which may include static grammar analysis, semantic constraint checking, and formal proof techniques to confirm that it meets the specified domain and task requirements without rule conflicts or structural ambiguities. Upon successful verification, the new DSL is stored back in the DSL library repository with updated metadata and embeddings, thereby enriching the repository for future warm-start retrieval and adaptation in subsequent tasks.

For example, a computer system can receive a task specification to develop an automated compliance-checking procedure for corporate sustainability reports, which should address both established financial reporting regulations and newly enacted environmental disclosure standards. Using the retrieval module, the system identifies two relevant DSLs from the repository: a verified financial reporting DSL based on a recognized reporting taxonomy, and an environmental compliance DSL used for climate-risk assessment in manufacturing disclosures. These DSLs are provided to the generation agent, which examines their abstract syntax trees and semantic rule sets to determine extension, modification, and merging opportunities. During extension, the generation agent augments the financial reporting DSL with new grammar productions representing greenhouse gas emissions disclosure and sustainability governance practices, defining semantic constraints for each such as permissible data types, required references to reporting periods, and crosslinking to financial metrics. Modification operations adjust certain existing rules within the financial reporting DSL to permit linkages between monetary performance indicators and the newly introduced environmental constructs, while also renaming specific symbols and rules to align with current regulatory terminology and avoid naming conflicts. Merging operations unify compatible grammar elements from the environmental compliance DSL into the extended financial DSL, such as integrating the climate-risk categorization logic into the fiscal risk reporting section, with a grammar-composition algorithm resolving potential ambiguities to yield a syntactically and semantically consistent combined grammar.

Once the new DSL is synthesized, it undergoes verification that includes static grammar analysis to confirm the reachability and completeness of its productions, semantic constraint checking to ensure correct interoperability between environmental and financial constructs, and formal proof techniques to verify that no internal contradictions exist between inherited and newly introduced rules. Upon successful verification, the completed Integrated Financial-Environmental Reporting DSL is stored back into the DSL library repository along with updated domain metadata, a record of the associated task context, and an updated embedding vector computed from its structural and semantic representation. This ensures that the newly created DSL is immediately available as a verified warm-start resource for future multi-domain compliance-checking tasks, thereby improving the system's efficiency and reducing the need for constructing similar DSLs from first principles.

Some embodiments may use multiple language models when constructing a DSL. Some embodiments may use a first language model to produce a symbolic grammar definition. Some embodiments may further execute a second language model to modify the symbolic grammar definition based on a set of verification rules. The verification rules may include constraints on syntax, semantics, safety requirements, and consistency with existing domain-specific standards. Such operations may increase the likelihood of producing grammar definitions that can be correctly parsed, executed, and validated within the target domain environment.

In some embodiments, the first language model may receive instructions to generate a symbolic grammar that describes the syntax and production rules of a new or extended DSL. This grammar may define tokens, non-terminal expressions, permissible structure sequences, and semantic tags required for domain operations. The generated grammar definition may then pass to a second language model that specializes in verification-aware modifications. This second model may analyze the grammar with respect to a stored set of verification rules, correcting any sections that conflict with domain-specific correctness constraints, removing unsafe constructs, and introducing disambiguation patterns where ambiguity exists. Formats such as BNF, EBNF, or ANTLR grammar specifications may serve as serialization formats for the grammar definition, enabling it to be stored, parsed, or tested automatically.

For example, a computer system may employ a first generative model to produce an initial grammar for a DSL used in satellite telemetry analysis. The grammar may define tokens for telemetry signal identifiers, message framing, and checksum validation structures. A second model may then receive this grammar and apply verification rules that ensure only validated checksum operations are permitted, that numerical ranges for parameters stay within satellite hardware limits, and that transmission-specific keywords do not overlap with reserved control codes. The resulting adjusted grammar may then be stored in a DSL library for use in generating parsing tools and execution engines for telemetry data processing.

In another example involving the use of models, a financial compliance monitoring system may direct a first language model to generate a grammar for parsing annotated ledger entries. This grammar may categorize transaction descriptors, define structures for compound financial statements, and assign semantic tags for regulatory classification. The monitoring system may then provide the output to a second language model that applies verification rules that encode permissible accounting principles, enforce numeric balancing constraints, and flag potential ambiguity between monetary amount formats. The final, verified grammar may be stored in a repository where downstream modules can use the grammar to generate compliance-parsing scripts for automated auditing.

Some embodiments may generate the DSL by retrieving a base grammar definition from a DSL library repository, where the grammar definition may be stored in structured formats such as BNF, EBNF, ANTLR grammar definition files, or JSON-based rule objects. The base grammar definition may indicate primitive constructs, for example, fundamental tokens, minimal non-terminal rules, and simple production sequences that represent the smallest valid structures in the language. A parsing engine may process a set of domain-specific knowledge sources using this base grammar definition. The parsing engine may tokenize inputs, match sequences against the primitive rules, and produce parse trees or ASTs that reflect recognized constructs. An entity identification module may examine these parsing results to detect entities, which may be determined through semantic pattern matching, named entity recognition models, domain ontology lookups, or controlled vocabulary matching.

Some embodiments may update a base grammar definition of a DSL being used to generate one or more constructs with a set of production rules selected based on a set of identified entities. A rule selection engine may query a repository of candidate rules tagged with metadata such as applicable entity types, syntax categories, and semantic domains. Selection criteria may involve direct entity-rule mapping, statistical association scores learned from prior corpus analysis, or rule activation conditions specified in a policy engine. Once selected, the production rules may be merged into the grammar definition using a grammar management module that appends or modifies non-terminal expansions, updates lexer token definitions, and resolves precedence or ambiguity conflicts. The augmented grammar may then be validated against a syntax verifier to confirm that it parses without conflicts and meets domain-specific syntax constraints.

Some embodiments may re-parse the set of knowledge sources using the updated grammar definition. This re-parsing may reuse an existing parser instance by hot-loading the updated grammar, or it may initiate a new parsing job from scratch depending on parser framework capabilities. The updated parsing process may yield expanded parse trees or ASTs that capture additional entity types, new syntactic structures, and refined semantic annotations. The pipeline may optionally log differences between the initial parse and re-parse results, enabling verification that new grammar rules successfully enhance coverage without introducing errors.

For example, a compliance automation system may retrieve from the DSL library a base grammar for a financial reporting DSL containing primitive constructs for entity labeling and numerical field parsing. The parsing engine may process a set of annual report disclosures and detect new entities such as "carbon emission offset statement" and "environmental asset valuation." The rule selection engine may locate production rules for these constructs, flagged in metadata as relevant to environmental risk reporting. The grammar manager may integrate these rules into the base grammar, adding non-terminal expansions for disclosures with environmental qualifiers. The system may then re-parse the disclosures, now producing structured AST segments for environmental data that were previously unrecognized, ready for downstream compliance checks.

In another example involving updates to a base grammar definition, a technical documentation analysis system may retrieve a base grammar for an equipment maintenance DSL that includes simple task statement constructs and equipment ID recognition. Parsing existing manuals may identify reference patterns to safety inspection routines not covered by the base grammar. The rule selection module may draw from a library of production rules that generate constructs for complex conditional inspection steps, integrating these into the grammar and re-parsing the manuals to capture full structured representations of both standard and safety-critical procedures.

Some embodiments may store, in a persistent memory, an earlier representation of the DSL together with associated domain classification data. The persistent memory may include a DSL library repository containing formal language definitions indexed by metadata such as industry category, operational focus, or application type. The stored earlier representation may consist of the DSL's grammar definition, production rules, and semantic annotations, along with version control and cross-domain compatibility tags. Some embodiments may determine a match between an intent specification, for example, a structured description of the desired capability or operation, and the value of the stored domain classification data. Upon finding such a match, some embodiments may retrieve the earlier representation of the DSL from persistent memory. Generating the new DSL may comprise using the retrieved earlier representation as a foundation, optionally adapting it with new constructs to fit the intent specification.

In some embodiments, an intent interpretation engine may process the intent specification, generating a vectorized or semantic representation of the desired task domain. This representation may be compared against indexed domain classification values stored with each DSL in the repository. Matching may employ exact metadata matching for discrete classification values (such as NAICS industry codes) or similarity-based matching using embeddings. Once a suitable match is identified, a DSL retrieval module may load the stored earlier grammar and associated metadata into memory. A generation component may then use this earlier grammar as a base, adding, modifying, or pruning constructs using domain-adapted rules to create the current DSL.

For example, a compliance automation system may store a previously generated DSL for financial reporting, classified under "Regulatory Filings-Financial Disclosures." When an incoming intent specification requests the generation of a DSL for "climate risk disclosures in annual financial reports," the classifier may match this request to the stored financial reporting DSL. The system may retrieve that earlier grammar and extend it with additional production rules for describing greenhouse gas emission metrics, climate governance structures, and related risk assessments. The resulting language would inherit core financial disclosure syntax while supporting new environmental reporting constructs.

In another example, a manufacturing analytics system may store an earlier DSL for "Equipment Maintenance Logs" in association with a manufacturing operations classification. When the system receives an intent specification for "predictive maintenance scheduling," the classifier may match the request to the stored maintenance DSL. The retrieved grammar may then be updated with production rules for forecast-related constructs and predictive model inputs, using the enriched language for analysis and schedule generation tasks.

Some embodiments may generate a set of intermediate computation values during execution of the set of constructs of the DSL. These intermediate computation values may include numeric results, conditional evaluation outputs, or partially aggregated metrics that arise from executing DSL production rules. Some embodiments may receive, during the execution of the set of constructs, an update to the set of constructs in response to a detected change in the set of knowledge sources. The change may be triggered by arrival of new data in a knowledge stream, detection of updated regulatory rules, or modifications to a monitored dataset. Some embodiments may modify the DSL during execution by inserting, deleting, or replacing a set of production rules without terminating execution. The system may continue execution of the set of constructs from the current execution state, reusing the previously stored intermediate computation values to avoid reprocessing unchanged portions of the reasoning workflow.

Some embodiments may include an execution engine with a dynamic grammar manager that maintains separation between state data, execution context, and active grammar definitions. A grammar modification subsystem may update the current DSL in-memory representation by applying incremental changes-such as adding new non-terminal rules, removing outdated syntax rules, or replacing production rules with updated versions-based on an update message from a knowledge source monitor. The execution scheduler may then resume interpretation or compilation of the updated grammar at the point where execution was interrupted, using the stored intermediate computation values for workflow continuity. This approach allows mid-reasoning DSL adaptation without restarting the entire pipeline.

For example, in one compliance monitoring system, the execution engine may begin reasoning over a financial compliance DSL to evaluate a set of corporate reports. Midway through processing, a live regulatory data stream may publish an update that adds new environmental disclosure requirements. The knowledge source monitor may detect this change and trigger an update to the DSL grammar, inserting new production rules that define syntax and semantics for "carbon intensity ratio" and "renewable energy usage" constructs. The execution engine may integrate these new rules immediately and continue from the current reasoning step, using previously computed intermediate metrics like "totalEnergyConsumption" and "scope1Emissions" without restarting. The final compliance report generated will incorporate the new requirements seamlessly within the same execution session.

As another example involving the generation and use of intermediate computation values, a real-time manufacturing quality control DSL may be actively monitoring sensor outputs. During this execution, a knowledge feed may indicate an updated safety threshold for a key measurement. The DSL grammar manager may replace the relevant production rule defining the structural check for this threshold while the system is still executing inspection routines. The execution engine may continue from the latest inspection state, using stored rolling averages and variance calculations rather than recalculating from the raw dataset, thus enabling rapid adaptation without downtime.

Some embodiments may generate a fused DSL by retrieving a plurality of previously generated DSLs, where each respective DSL is associated with a different respective domain classification in a DSL library repository. The DSL library may maintain these DSLs alongside metadata and classification tags that describe their domain applicability, supported syntax, and semantic rule sets. Some embodiments may identify, based on stored entity alignment rules, a set of named entities and relationships that are semantically equivalent across the plurality of previously generated DSLs. The entity alignment rules may be defined manually, learned from cross-domain corpora, or discovered through ontology matching techniques, and may map equivalent entity labels, normalize variations in relationship naming, and standardize rule semantics. Some embodiments may then generate the fused DSL by merging production rules from the plurality of previously generated DSLs, reconciling syntax conflicts and ensuring semantic consistency across the fused grammar.

Some embodiments may load entity definitions and relationship graphs from each candidate DSL. These definitions and graphs may be compared using alignment rules that check for lexical similarity, shared identifiers, or mapped ontology classes. Equivalent constructs may be tagged for unification, while domain-specific constructs without equivalents may be preserved as domain-exclusive rules. A grammar fusion module may then create the fused DSL by merging production rule sets, deduplicating overlapping syntax rules, introducing namespaced constructs where necessary to avoid conflicts, and generating cross-domain constructs that enable reasoning over both domains. The result is a hybrid execution grammar that supports compositional reasoning across the source domains.

For example, a compliance analytics system may retrieve a financial reporting DSL classified under "Corporate Filings" and an environmental reporting DSL classified under "Sustainability Disclosures." Stored entity alignment rules may indicate that "facility" in the environmental DSL maps to "operating unit" in the financial DSL, and that "annual emissions" maps to "environmental impact metric." Using these alignments, the system may merge production rules for both domains into a fused compliance DSL. This DSL may allow queries and reasoning that span both financial and environmental contexts in a single execution—for example, computing combined financial performance and emission intensity metrics for each facility—without switching between separate grammars.

As another example of generating a fused DSL, a healthcare operations platform may retrieve a clinical procedure tracking DSL and a hospital resource scheduling DSL. Entity alignment rules may match "procedure room" in one DSL to "sterile operating theatre" in the other and align patient-related constructs across both grammars. The fused DSL may merge production rules so the reasoning engine can create schedules that optimize both procedure throughput and compliance with staffing constraints, enabling compositional reasoning that considers both clinical processes and logistical resource availability.

Some embodiments may generate an output by executing the constructs expressed in the DSL to perform reasoning operations responsive to the messages, as indicated by block 424. Some embodiments may generate an output message by executing a set of constructs expressed in a DSL to perform reasoning operations responsive to a set of messages. The DSL, in various embodiments, may take multiple forms, including but not limited to a formally defined grammar, a symbolic programming language, a graph-structured representation of entities and relationships, or an intermediate representation tailored to the target domain. The set of constructs may therefore represent syntax rules, logic operators, transformation functions, procedural steps, or entity-relationship declarations, depending on the particular representation. The reasoning operations may be carried out by interpreting these constructs in a symbolic runtime environment, transforming them into lower-level executable code, or applying them as inference rules within a reasoning or constraint-solving framework. Execution may involve matching the constructs against structured facts derived from the set of messages, incrementally applying valid operations, and producing an output message that reflects the results of the reasoning flow.

In some embodiments, the DSL may be represented as a grammar in one of various formats, such as EBNF or PEG.

In other embodiments, the DSL may be produced as a symbolic program in a domain-neutral execution format, such as an abstract instruction set or a rule-based logic script, that can be run within a general-purpose or domain-specialized execution engine. The set of constructs may be validated through syntactic checks against formal language definitions, semantic analysis via ontology-based reasoning, or logical verification through satisfiability checking. The execution process may be sequential, parallel, or constraint-driven, with possible embodiments using forward chaining, backward chaining, event-driven activation, or model-checking techniques to apply the constructs to the input data.

Some embodiments may load a verified set of constructs from a repository of DSLs and execute them against a reasoning context populated with entities, attributes, and relationships extracted from the set of messages. Such operations may involve compiling the constructs into an intermediate representation for execution speed, while in others the constructs may be interpreted directly to allow dynamic modification and debugging. Possible embodiments may store the intermediate representation as an AST, a graph structure, or a rule index optimized for query-like reasoning. The reasoning operations may incorporate tight constraint checking at each step, possibly using a satisfiability modulo theories (SMT) solver, a description logic reasoner, or a custom dependency resolution algorithm, increasing the likelihood that all output messages comply with the domain-specific constraints embedded in the language.

For example, some embodiments may execute a set of constructs modeling compliance requirements for financial disclosures. This set of constructs may be expressed in the form of symbolic rules verifying that a "risk disclosure" entity is linked, within a defined scope, to at least one "mitigation strategy" entity, while also ensuring that specific timing or jurisdictional constraints are met. Reasoning operations may traverse structured document sections extracted from the set of messages, match them against the entity-relationship patterns defined in the DSL, and record compliance or violation states. The resulting output message may include both the compliance determination and an execution trace showing the constructs used and the intermediate inferences reached during processing.

In another example, embodiments addressing equipment fault diagnostics may execute a DSL where the set of constructs is a dependency graph connecting "sensor reading" nodes to "fault condition" nodes via "component state" relationship rules. In this case, reasoning operations may run a forward-chaining process over the graph, activating fault condition nodes when all precursor conditions are met, and generating an output message that contains identified fault conditions, ranked according to severity. In yet other embodiments, the same diagnostic problem could be addressed using a grammar-based DSL that encodes permissible sequences of diagnostic tests, interpreted sequentially to reach a diagnosis. Both these representations would be consistent with the DSL concept, since each formalizes the reasoning in a manner that is interpretable, verifiable, and adaptable to future modifications.

Before using a constructed set of DSL constructs, some embodiments may verify the constructs against safety properties, domain rules, and correctness requirements before updating the generative language model. This verification process may involve a multi-stage pipeline where the generated DSL constructs are first tested for syntax compliance using formal grammar validation, then assessed for semantic consistency with domain ontologies, and finally evaluated under safety verification and compliance checking against operational constraints or regulatory requirements. The system may produce an execution trace of verification outcomes, from which a reward vector is generated. This reward vector may contain component reward values corresponding to a set of verification criteria, such as syntax compliance and semantic consistency, as well as domain-specific safety compliance and performance efficiency. Each component reward value may be compared against a stored truth set representing expected correct behavior. The reward vector may then be converted into a set of gradient update values, which are applied to adjust distinct parameter subsets of the generative language model, thereby improving future DSL generation performance.

A computer system may implement this process by compiling a DSL program into an intermediate representation that can be evaluated for logical correctness and safety compliance. A syntax analysis may validate that all grammar productions conform to the DSL specification, while a semantic analysis may check consistency of entity and relationship usage according to extracted knowledge source rules. Safety checking may involve formal methods such as satisfiability solving or model checking to confirm that no unsafe or non-compliant execution paths are possible. The verification results may then be encoded into a reward vector, where each dimension corresponds to a distinct verification criterion such as grammar correctness, semantic agreement, constraint adherence, and operational safety. These values may be normalized against a stored truth set and converted into a set of gradient update values through a reinforcement learning optimization routine, allowing selective adjustment of the language model's attention weights, embedding layers, or output decoding parameters to bias future generations toward verified correctness.

For example, when processing a DSL for "automated electrical grid load balancing," the system may run verification to check syntax compliance with the DSL grammar, semantic consistency with accepted grid operation policies, and safety properties such as "no overload on transmission line node beyond rated capacity." The execution trace may record that while grammar and semantics passed, one safety constraint was violated in a corner case. The reward vector may thus contain maximum values for syntax and semantic criteria but a reduced value for the safety criterion. The resulting set of gradient update values may then selectively adjust the language model parameters responsible for constraint generation, improving future DSL outputs so that all safety criteria are satisfied.

Alternatively, for a computational intent related to "clinical trial drug interaction modeling," the verification process may evaluate the generated DSL against syntax compliance rules, semantic mapping to biomedical ontologies, and safety properties like "prohibited drug-drug interactions." If the execution trace shows full syntax compliance and partial semantic coverage but flags multiple unsafe combinations, the reward vector may reflect these deficiencies. Corresponding set of gradient update values may then focus updates on the model's relational composition capabilities, thereby increasing the likelihood of producing DSLs that are both syntactically correct and fully compliant with safety rules in subsequent generations.

Some embodiments may present the output message via a real-time communication platform during an ongoing communication session, as indicated by block 428. Some embodiments may present the output message after executing the set of constructs expressed in a DSL and performing reasoning operations responsive to a set of messages. The presentation may occur in multiple forms depending on the operational context. In some embodiments, the output message may be delivered in a structured serialization format such as JSON, Extensible Markup Language (XML), or a compact binary encoding to facilitate automated ingestion by downstream systems. In other embodiments, the presentation may be unstructured or semi-structured text, a formatted visual report, or an interactive element rendered within a graphical interface. Delivery may occur through a local user interface, an offline report, or an external integration endpoint. In certain embodiments, the presentation subsystem may apply optional preprocessing such as result summarization, relevance filtering, or redaction to meet display constraints, privacy requirements, or communication channel limitations.

In some embodiments, when a real-time communication platform is used during a live communication session, the output message may be presented through a channel or event mechanism supported by that platform. Possible embodiments may transmit the message as a synchronous payload using protocols such as WebSocket messaging, publish/subscribe event topics, or application-level push mechanisms. In other examples, the message may be presented incrementally through a streaming interface, allowing intermediate reasoning results to be delivered before completion of the full reasoning process. Session state may be maintained between deliveries, enabling recipients to correlate incremental updates with the originating reasoning task. In certain embodiments, presentation may also involve adaptive rendering logic, where the output is formatted differently depending on whether the recipient is using a desktop web client, a mobile application, or a voice-based system.

A computer system, in some examples, may also incorporate error-handling and fallback mechanisms in output presentation. For instance, if the primary transmission channel encounters a failure, the presentation subsystem may automatically queue the message for retry or deliver it through an alternate method such as email, file upload, or a status update in a shared workspace. In yet other embodiments, presentation logging may occur in parallel, preserving an audit trail of the output content, delivery timestamp, target recipient, and message format for traceability or compliance purposes.

For example, in a regulatory compliance embodiment, the system may generate an output message containing a categorized list of findings, each with an associated reasoning trace derived from the executed set of constructs. If the compliance verification is taking place during a live consultation session, the structured output may be serialized as JSON and transmitted via a WebSocket channel to a shared compliance dashboard visible to both the analyst and oversight personnel. The dashboard may highlight violations in real time as they are detected, enabling prompt discussion and remediation.

In another example involving equipment fault diagnosis, the system may produce an output message consisting of an annotated network diagram with highlighted fault paths, along with a ranked list of probable issues. During an active maintenance coordination call, the diagram and findings may be sent as incremental updates to a mobile application through a publish/subscribe channel, ensuring technicians receive the highest-priority findings as soon as they are confirmed by the reasoning operations. If connectivity issues occur, the same output message may be stored in a persistent queue and subsequently delivered through the maintenance team's document repository in machine-readable XML form for archival and review.

Some embodiments may store, in persistent storage, an execution trace mapping the set of constructs to the corresponding portions of the output, as indicated by block 432. Some embodiments may store, in persistent storage, an execution trace that indicates a mapping between the set of constructs expressed in a DSL and a set of portions of the output generated during reasoning operations responsive to a set of messages. In some embodiments, the execution trace may take the form of a structured data record, such as a database row, document object, or serialized graph structure, that includes unique identifiers for each construct, identifiers for the output portions affected, a timestamp, and metadata describing the reasoning step or operation type. The identifiers for the set of constructs may be generated at DSL definition time and stored in a construct registry to allow consistent reference across executions. Identifiers for output portions may correspond to positions in structured content, such as JSONPath expressions, XML node references, document paragraph IDs, or table/coordinate references, ensuring clear and repeatable mapping. In some cases, the execution trace may store a direct one-to-one or one-to-many mapping between construct IDs and output identifiers. In other cases, the trace may store more general reasoning step logs that contain enough information—such as construct references and resulting data segments—to derive the mapping later through queries or correlation.

In some possible embodiments, the system may record the execution trace as a flat mapping table with fields for construct identifier, version of the construct, reasoning step description, output portion identifier, and confidence score. In other possible embodiments, a hierarchical or graph-based representation may be used to show the sequence and dependency of reasoning steps, where parent nodes represent high-level constructs and child nodes represent sub-operations or derived constructs, with edges linking them to output portion nodes. The persistent storage medium may be a relational database, a graph database, a distributed key-value store, or a version-controlled file repository, depending on requirements. The execution trace may also store environment information such as the DSL version hash, execution engine build, and input dataset reference to ensure reproducibility.

For example, in a financial compliance verification context, an execution trace may be stored in a relational database where each record includes the following: construct ID "C102-high-risk disclosure requires mitigation," applied to output portion "Sec_4.3 of Filing_2023Q4," with a recorded result of "Mitigation Present," a timestamp, and a reference to the DSL version. The mapping may be direct, with the construct ID and output portion explicitly linked, or indirect, where separate fact tables log construct applications and output annotations and a join operation produces the mapping when required. This trace would enable an auditor to search for all constructs that influenced a given compliance determination or all outputs generated by a specific construct.

In another example involving equipment fault diagnostics, the execution trace may be stored in a graph database where construct nodes such as "Rule_TempThreshold_84C" are connected to sensor reading nodes and resulting output alert nodes. The relationship edges may include attributes that capture execution time, input values, and confidence scores. Technicians reviewing the trace could traverse the graph from an alert back to all constructs that contributed to it, seeing the precise chain of reasoning. In some embodiments, the stored graph may be visualized to show which constructs were most active in reasoning during a given time period, assisting in post-event analysis. These possible embodiments increase the likelihood that the execution trace serves as a flexible, queryable, and verifiable record of the mapping between the set of constructs and the generated output portions, facilitating auditability, reproducibility, and system improvement without constraining the implementation to a single representation or storage approach.

Some embodiments may store the execution trace by writing, to persistent storage, a structured data record that includes three distinct fields. A first field may store identifiers for constructs of the DSL, where each identifier uniquely references a primitive or composite DSL construct used during output generation. A second field may store the positions within the generated output that each construct affects, enabling direct mapping from parts of the final output back to originating DSL constructs. A third field may store values of intermediate computations performed by the constructs, such as numeric results from rule evaluations, conditional test outcomes, or aggregated metrics. The structured data record may be serialized in a representation such as JSON, Protocol Buffers, or an SQL relational schema, and stored in persistent memory such as a document-oriented database, a key-value store, or an immutable log file system.

Some embodiments may implement this by having the execution engine execute the runtime environment for the generated DSL program. As each construct executes, the engine may capture the construct's unique identifier, determine the span or position in the final output where its effects appear, and record any intermediate computed values. Upon program completion, these records may be compiled into the structured data object and persisted. This allows downstream systems—including verification modules, debugging tools, and training signal generators—to trace final outputs back to their generating constructs along with detailed computational context.

For example, in one embodiment a compliance automation system may generate a JSON execution log while interpreting a DSL-based compliance rule set for financial reporting. The log's first field may contain construct IDs such as "calcTotalAssets", "checkLiquidityRatio", and "emitComplianceAlert". The second field may list exact sentence or paragraph positions in the generated compliance report—such as character offsets or structured annotation IDs-indicating which sentences were produced or modified by each construct. The third field may contain intermediate numerical values computed during rule evaluation, including ratios like "liquidityRatio: 1.25", boolean flags like "isCapitalAdequate: true", and thresholds used in validations. This JSON record may be stored in persistent memory for later auditing, model fine-tuning dataset generation, or dispute resolution.

FIG. 5 shows a flowchart of a process 500 for updating a language model trained to generate DSLs, in accordance with one or more embodiments Some embodiments may obtain training records for training, as indicated by block 508. Some embodiments may obtain and collect a set of DSL constructs from a DSL library. The collected constructs may be associated with metadata such as version identifiers, domain categorization, dependency information, and historical performance metrics. Verification processes may be applied to confirm conformance with safety properties, consistency rules, and domain-specific correctness before these constructs are approved for downstream use. The resulting verified set of DSL constructs may serve as a high-quality, structured data resource for training, validation, and further automated processing. These operations may increase the likelihood of producing a clean and reliable foundational dataset from which additional synthetic data can be derived.

Some embodiments may generate a plurality of synthetic training records, where each training record contains an input representation of a problem, an expected set of DSL constructs, and a corresponding verified output. Some embodiments may store the plurality of synthetic training records in persistent memory for later use. Some embodiments may train the generative language model with the plurality of synthetic training records to improve the model's ability to produce correct, verifiable, and domain-appropriate outputs. Such operations may increase the likelihood of producing a language model that generates DSL constructs which meet correctness, consistency, and efficiency targets established by the verification framework.

Some embodiments may obtain verified DSL constructs from a central DSL library. An automated conversion engine may create a training record by generating an input problem description, associating it with the correct set of DSL constructs for solving the problem, and capturing the verified output produced by running the constructs in the execution engine. This record may be serialized into a structured format, such as JSON or a database entry, and written to persistent memory, which could be a distributed object store, a SQL database, or a specialized training data repository. Once the dataset reaches the required scale, a training orchestration system may load the records in batches and fine-tune the generative language model to map problem inputs to the expected DSL constructs and outputs.

A computer system may, for example, generate 50,000 synthetic training records for a healthcare scheduling DSL. Each record may include an input prompt describing a patient scheduling scenario, the exact set of DSL statements needed to perform the task, and the verified execution result showing correct appointment allocation. These records may be stored in a high-availability cloud storage service with indexing metadata for quick lookup. A distributed fine-tuning pipeline may then train the generative model by feeding these stored records through a series of epochs, using gradient descent to minimize loss between predicted and expected DSL outputs. This may produce a model that reliably generates correct DSL constructs for a range of healthcare appointment scheduling tasks.

Some embodiments may filter the set of training records based on a set of criteria to form training curriculum, as indicated by block 512. Some embodiments may filter training data based on a defined set of criteria to create a structured training curriculum. Filtering criteria may include verification success rates, adherence to safety properties, correctness as determined by semantic and syntactic validation, and consistency with established DSL constructs in a reference repository. Training examples may be organized into progressively challenging tiers, beginning with basic constructs exhibiting high reliability and minimal complexity, and advancing to novel constructs requiring sophisticated problem-solving capabilities. Competency gates may be applied between tiers, allowing only examples meeting specified performance thresholds to be included in higher-complexity stages of the curriculum.

Some embodiments may generate and collect synthetic training records that have undergone verification, augmentation, and initial quality control. A verification metrics engine may compute scores for correctness, safety compliance, execution efficiency, and library consistency. A rule-based filtering subsystem may remove any records falling below predefined benchmark thresholds for these measures.

Remaining records may be classified into levels such as Basic, Intermediate, Advanced, Expert, and Novel based on complexity features and measured proficiency requirements. Competency gate modules may validate that examples passed into a higher curriculum stage meet minimum verification success percentages, such as 90% for Basic level, 75% for Intermediate, 60% for Advanced, 80% for Expert, and 85% for Novel constructs. The output may be an ordered, performance-driven training curriculum that increases model exposure from simple verified examples to complex reasoning sequences.

For example, a computer system may obtain a dataset of synthetic training records for a regulatory compliance DSL and process it through a filtering and curriculum assignment module. The computer system may first assess each record's correctness by running the contained DSL code in a verification engine, checking for syntax validity, domain-specific semantic accuracy, and alignment with established compliance rules. The computer system may then rate safety compliance by verifying that no rule conflicts with regulatory limits or induces unsafe execution states. Records passing the thresholds may be sorted by logical complexity, such as single-step entity association (Basic), multi-step rule application (Intermediate), conditional branching (Advanced), adaptive rule selection (Expert), and inventive cross-domain rules (Novel). At each stage, a competency gate may evaluate whether the record's historical verification success rate meets or exceeds the required percentage before inclusion in the corresponding difficulty tier. This process may produce a curriculum that incrementally develops model capability from foundational to innovative DSL reasoning.

Some embodiments may perform a model update on a language model based on the filtered set of training records, as indicated by block 516. Some embodiments may perform a model update on a language model using a filtered set of training records that have been organized into a structured curriculum. The update process may operate within a continuous optimization loop where each iteration uses this curated dataset to adjust model parameters for improved accuracy, safety compliance, and adherence to domain-specific rules. The filtered set may include examples ordered from low to high complexity, ensuring that the model develops foundational proficiency before encountering advanced problem scenarios. By training on the curriculum in stages, some embodiments may increase the likelihood of reducing verification errors and improving structured language generation capabilities over time.

Some embodiments may execute verification-guided continuous model optimization by using the filtered curriculum in conjunction with a reinforcement learning mechanism. Verification processes may produce both rewards and penalties based on whether generated outputs satisfy correctness checks, safety constraints, and domain conformity. Positive rewards may result from passing all verification tests, demonstrating semantic consistency, and meeting execution efficiency targets. Penalties may be applied for verification failures, semantic mismatches, or unsafe execution behavior. Model parameters or associated adapters may then be updated to increase the likelihood of producing outputs that satisfy verification rules, improving future model performance.

The optimization process may also involve generating a reward vector from execution traces of model outputs. Each reward vector may contain multiple component reward values, where each component corresponds to a specific verification criterion compared against a stored truth set.

Such criteria may include syntax compliance to check structural formatting against language rules and semantic consistency to confirm logical agreement with the intended meaning. The reward vector may then be used to derive gradient update values, with each subset of the language model parameters receiving distinct adjustments based on the verification signals relevant to its functional role in text generation.

Some embodiments may include a performance evaluation stage following each model update to assess the effects of parameter adjustments. This evaluation may compute verification pass rates, measure output quality according to domain-specific standards, and quantify generation efficiency in producing correct results. Performance statistics may feed back into the optimization loop, updating reward calculation strategies or reweighting curriculum tiers for subsequent training rounds. The integration of these metrics into the continuous learning process may increase the likelihood of sustained improvement of the language model over repeated optimization cycles.

A computer system may, for example, update a financial compliance language model using a filtered curriculum derived from verified synthetic training records. The computer system may run the model against each record, generating DSL outputs and execution traces. From each trace, the computer system may compute a reward vector containing component scores for syntax correctness with respect to a compliance DSL grammar and semantic consistency against a regulatory truth set. Using these reward vectors, the computer system may apply gradient updates to targeted sets of parameters in a LoRA adapter attached to the base model. After updating, the computer system may evaluate performance by comparing the model's verification pass rates on both training and unseen compliance tasks, measuring improvement in both accuracy and efficiency, and then feed these results back into the reinforcement learning loop for continued refinement.

Some embodiments may generate, from the execution trace, a reward vector that contains component reward values corresponding to a set of verification criteria evaluated against a stored truth set. The verification criteria may include at least one of a syntax compliance criterion, which evaluates conformance of the generated output to defined grammar and formal structure rules, and a semantic consistency criterion, which evaluates accuracy of generated outputs in reproducing the intended meaning as represented in the stored truth set. Additional criteria may address safety properties, execution efficiency, or adherence to domain-specific constraints. The generated reward vector may represent each criterion as an independent dimension, allowing fine-grained feedback for model optimization.

Some embodiments may update the language model by adjusting distinct parameter subsets using a set of gradient update values derived from the reward vector. Parameter subsets may correspond to particular functional components of the model, such as attention weights, embedding layers, or domain-adaptation adapters like Low-Rank Adaptation (LoRA) modules. A gradient computation module may process the reward vector to determine the contribution of each criterion to the overall update signal, applying greater weight to parameters most relevant to that criterion. The model parameters may then be adjusted using these gradient values in a reinforcement learning with human or automated feedback (RLHF/RLAIF) loop to increase the likelihood of generating outputs that meet all targeted verification criteria.

For example, a DSL generation system may produce output for a set of financial compliance criteria. The execution engine may generate execution traces showing both the generated DSL statements and the steps taken to produce the DSL statements. These traces may be evaluated against a stored truth set of validated DSL code using a syntax compliance check (e.g., formal parsing of the output with a DSL grammar) and a semantic consistency check (e.g., comparing the logical relationships and data bindings in the output with those in the truth set). The reward vector may include a syntax compliance score of 0.95 and a semantic consistency score of 0.88. The gradient update module may use these scores to generate separate update signals for the syntax-focused parameter subset and the semantics-focused parameter subset, leading to targeted updates that improve both grammar adherence and logical accuracy in future outputs.

In another example, a technical document summarization DSL may produce summaries of manufacturing process logs. Execution traces show the specific rules applied from the DSL to produce summaries, and verification evaluates them against a stored truth set annotated by domain experts. Syntax compliance is measured by validating that the summaries adhere to DSL statement structure formats, while semantic consistency is measured by confirming that extracted metrics from the logs match those in the expert summaries. The resulting reward vector may assign greater value to syntax compliance when the model is already strong on semantics, adjusting early-stage layers that influence grammar generation while leaving semantic reasoning components less modified.

A research code generation assistant may similarly use execution traces from generated DSL-based scripts, check them against a canonical test suite as the truth set, and compute separate reward components for syntax (compiles and adheres to DSL grammar) and semantics (passes required functional tests). Gradient updates derived from these multiple feedback channels may update relevant model heads differently, allowing optimization to focus selectively on parts of the model most responsible for errors in those criteria. This targeted reinforcement approach may lead to faster and more reliable convergence than a uniform gradient update across the entire model.

Some embodiments may deploy the updated language model, as indicated by block 520. Some embodiments may deploy the updated language model following completion of a model optimization and evaluation cycle. Deployment may involve moving the newly updated model, or its updated parameter adapters, from a training environment to an operational environment where it is integrated into the active system pipeline. The deployment stage may be triggered once the updated model satisfies defined performance benchmarks related to verification accuracy, safety compliance, generation efficiency, and output quality. Deployment may be performed in a way that preserves backward compatibility with dependent subsystems, while enabling the updated model to respond to production input requests.

Deployment may begin with operations to package a model in a version-controlled environment, including the updated model weights, adapter modules, and configuration files. This package may then be registered with an orchestration or model management system that can perform automated integrity checks, dependency verifications, and compatibility validations against operational APIs. Runtime monitoring hooks may be embedded to capture live usage metrics and verification results during production operation. The deployment pipeline may allow for either full replacement of the prior production model or a staged rollout where the updated model is served alongside the previous version until designated performance levels are confirmed.

Some embodiments may integrate deployment with the continuous learning loop by establishing a feedback interface from operational usage back into the verification-guided optimization system. This interface may collect runtime data such as execution traces, live verification pass rates, and safety compliance incidents. The aggregated operational metrics may then feed into future optimization cycles, allowing post-deployment performance to influence subsequent model fine-tuning phases. This approach may increase the likelihood of maintaining or improving model quality across successive deployments.

Some embodiments may maintain operational redundancy during deployment to reduce downtime and operational risks. This may include retaining the previous model as a hot or warm standby, implementing rollback procedures in case of degradation, and employing traffic shadowing techniques to evaluate updated model performance under production load before full activation. Such deployment safeguards may help preserve service stability while capturing the benefits of newly optimized parameters in the updated language model.

A computer system may, for example, complete an update of a compliance-focused DSL generation model using verification-guided reinforcement learning. Once the updated adapter parameters pass all internal evaluation thresholds, the computer system may package the model and register it with a model orchestration server. The deployment procedure may involve a staged rollout, where a small portion of production queries such as regulatory report synthesis tasks are routed to the updated model while the rest target the incumbent model. Real-time monitoring may measure live verification pass rates and safety compliance incidents for the new version. Once these operational metrics meet or exceed defined thresholds, traffic may be fully shifted to the updated model, completing the deployment process while initiating a new feedback cycle for the continuous improvement loop.

Figure 6:
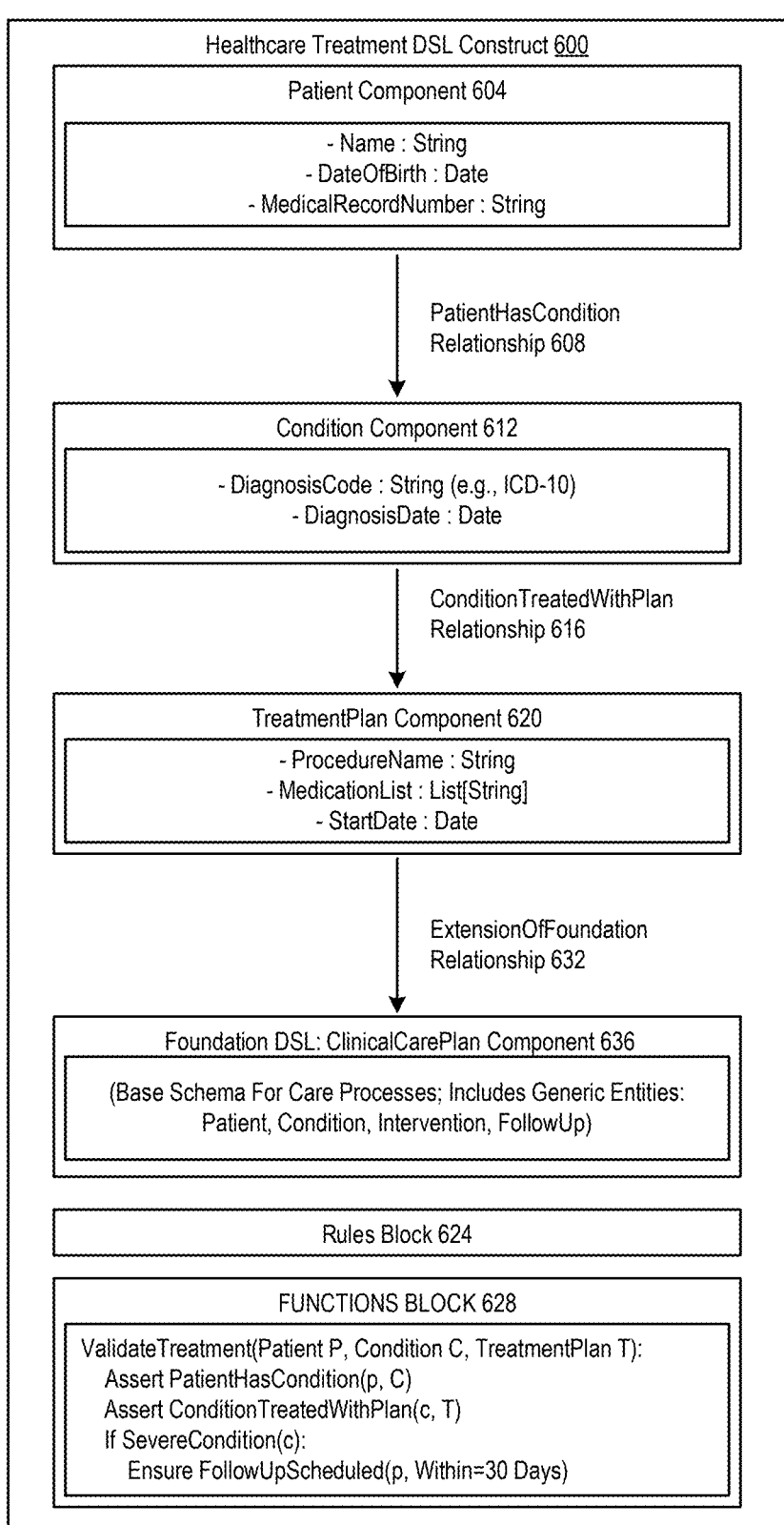
FIG. 6 shows an example embodiment of a DSL construct, in accordance with one or more embodiments.

FIG. 6 shows an example embodiment of a DSL construct, in accordance with one or more embodiments. The DSL construct 600 may be generated by a multi-agent architecture. The DSL construct 600, as shown, may be self-contained and formally defined so that it can be parsed, verified, executed, stored, and retrieved by the system in a consistent manner.

The DSL construct 600 may define a patient component 604, which models an individual receiving medical care, including exemplary attributes such as patient name, date of birth, and medical record number. The patient component 604 is connected via a PatientHasCondition relationship 608 to a condition component 612, which represents a diagnosed medical condition and may include attributes such as a standardized diagnosis code (for example, ICD-10) and the diagnosis date.

The condition component 612 is linked through a ConditionTreatedWithPlan relationship 616 to a treatment plan component 620. The treatment plan component 620 models a prescribed course of care and may include attributes such as a procedure name, a list of medications, and a treatment start date. The treatment plan component 620 participates in an ExtensionOfFoundation relationship 632 connecting it to a foundation DSL: clinical care plan component 636. The clinical care plan component 636 represents a pre-existing, general-purpose healthcare DSL for representing care processes, containing generic entities such as patient, condition, intervention, and follow-up, along with broad rules for sequencing care activities. The ExtensionOfFoundation relationship 632 signifies that the treatment plan component 620 refines the generic "intervention" entity of the clinical care plan component 636, adding oncology-specific constraints such as permissible medication combinations for certain cancer stages.

The DSL construct 600 also contains a rules block 624 that includes representative, non-limiting logic. For example, the PatientHasCondition relationship 608 may be required to have a condition diagnosis date no later than the current date. The ConditionTreatedWithPlan relationship 616 may require all medications to be approved for the given condition per clinical guidelines and to have a treatment start date later than the diagnosis date. The ExtensionOfFoundation relationship 632 may impose rules ensuring the treatment plan conforms to both the foundation DSL structure and specialty-specific domain rules. Additional verification conditions in the rules block 624 can include prevention of conflicts with recorded medication allergies and checking that all procedures are listed in an approved clinical catalog.

The DSL construct 600 further includes a functions block 628 containing executable logic for reasoning and verification. The functions block 628 includes a "ValidateTreatment" function that accepts, as inputs, a patient, condition, and treatment plan. "ValidateTreatment" asserts the PatientHasCondition and ConditionTreatedWithPlan relationships, and, if the condition's severity threshold is met, ensures that a follow-up appointment is scheduled within a specified time window.

As an example illustrating the use of the DSL construct 600, a computer system may obtain a patient record having the following data, where the patient name is "Alice Brown": born Mar. 12, 1975, has a diagnosed condition with ICD-10 code C34.1 (malignant neoplasm of upper lobe, right bronchus or lung) on May 18, 2024. A candidate treatment plan is created with a procedure "Chemotherapy Cycle 1," medications "DrugA" and "DrugB," and a start date of Jun. 1, 2024. Using the DSL construct 600, the system first verifies the PatientHasCondition relationship 608 by checking the diagnosis date validity. It then verifies the ConditionTreatedWithPlan relationship 616 by confirming that the medications are approved for ICD-10 code C34.1 and that the start date follows the diagnosis date. Next, the ExtensionOfFoundation relationship 632 is evaluated to confirm that the double-therapy medication combination satisfies oncology intervention rules inherited from the foundation DSL: clinical care plan component 636. Global verification conditions from the rules block 624, including an allergy check and procedure catalog validation, are applied. The ValidateTreatment function from the functions block 628 is then executed, and because the SevereCondition predicate is true, a follow-up requirement is confirmed to be satisfied. This reasoning sequence enables the system to generate an interpretability trace such as: "Treatment Plan verified and approved. All medications comply with guidelines for ICD-10: C34.1, no allergy conflicts detected, procedures align with approved oncology protocols, and follow-up scheduled as per severity requirements."

The above-described embodiments of the present disclosure are presented for purposes of illustration and not of limitation, and the present disclosure is limited only by the claims which follow. Furthermore, it should be noted that the features and limitations described in any embodiment may be applied to one or more other embodiments herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods. Furthermore, not all operations of a flowchart need to be performed.

Furthermore, the computing devices described in this disclosure may be any type of computing device unless otherwise stated, including, but not limited to, a laptop computer, a tablet computer, a hand-held computer, and/or other computing equipment (e.g., a server), including "smart," wireless, wearable, and/or mobile devices. Furthermore, the embodiments described in this disclosure may include an individual device that performs some or all the operations described in this disclosure. Alternatively, other embodiments may include multiple computing devices acting collectively to perform some or all the operations described in this disclosure.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on one or more non-transitory, machine-readable media (e.g., a set of machine-readable storage media), such as an electronic storage medium. Furthermore, the use of the term "media" may include a single medium or combination of multiple media, such as a first medium and a second medium. One or more non-transitory machine-readable media storing instructions may include instructions included on a single medium or instructions distributed across multiple media. For example, non-transitory media may act as one or more memory, where one or more memory may store program instructions that are written as source files or written in machine-executable program code. The processing devices may include one or more devices configured through hardware, firmware, and/or software to be specifically designed for the execution of one or more of the operations of the methods.

In some embodiments, the various computer systems and subsystems illustrated in FIG. 1 or other figures described in this disclosure may include one or more computing devices that are programmed to perform the functions described herein. The computing devices may include one or more electronic storages (e.g., a set of databases accessible to one or more applications depicted in the system 100), one or more physical processors programmed with one or more computer program instructions, and/or other components. For example, the set of databases may include one or more relational databases. Alternatively, or additionally, the set of databases or other electronic storage used in this disclosure may include one or more non-relational databases.

The computing devices may include communication lines or ports to enable the exchange of information with a set of networks (e.g., a network used by the system 100) or other computing platforms via wired or wireless techniques. The network may include the internet, a mobile phone network, a mobile voice or data network (e.g., a 5G or Long-Term Evolution (LTE) network), a cable network, a public switched telephone network, or other types of communication networks or combination of communication networks. A network described by devices or systems described in this disclosure may include one or more communications paths, such as Ethernet, a satellite path, a fiber-optic path, a cable path, a path that supports internet communications (e.g., IPTV), free-space connections (e.g., for broadcast or other wireless signals), Wi-Fi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storage may include one or more non-transitory machine-readable media (e.g., storage media) that electronically store information. The storage media of the electronic storages may include one or both of (i) system storage that is provided integrally (e.g., substantially non-removable) with servers or client computing devices, or (ii) removable storage that is removably connectable to the servers or client computing devices via port (e.g., a USB port, a firewire port, etc.) or drive (e.g., a disk drive, etc.). The electronic storages may include one or more optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent the processing functionality of a plurality of devices operating in coordination. The processors may be programmed to execute computer program instructions to perform functions described herein of subsystems described in this disclosure or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of the subsystems described in this disclosure may provide more or less functionality than is described. For example, one or more of subsystems described in this disclosure may be eliminated, and some or all of its functionality may be provided by other ones of subsystems described in this disclosure. As another example, additional subsystems may be programmed to perform some, or all of the functionality attributed herein to one of the subsystems described in this disclosure.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interface nor displays and may instead receive and display content using another device (e.g., a dedicated display device, such as a computer screen, and/or a dedicated input device, such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than a mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "the element" includes a combination of two or more elements, notwithstanding the use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompass all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection has some property should not be read to exclude cases where some otherwise identical or similar members of a larger collection do not have the property (i.e., each does not necessarily mean each and every). Limitations as to the sequence of recited steps should not be read into the claims unless explicitly specified (e.g., with explicit language like "after performing X, performing Y") in contrast to statements that might be improperly argued to imply sequence limitations (e.g., "performing X on items, performing Y on the X'ed items") used for purposes of making claims more readable rather than specifying a sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining," or the like refer to actions or processes of a specific apparatus, such as a special purpose computer or a similar special purpose electronic processing/computing device. Furthermore, unless indicated otherwise, updating an item may include generating the item or modifying an existing item. Thus, updating a record may include generating a record or modifying the value of an already-generated value in a record. Additionally, as used in the specification, "a portion" refers to a part of, or the entirety of (i.e., the entire portion), a given item (e.g., data) unless the context clearly dictates otherwise.

Unless the context clearly indicates otherwise, ordinal numbers used to denote an item do not define the item's position. For example, an item that may be a first item of a set of items even if the item is not the first item to have been added to the set of items or is otherwise indicated to be listed as the first item of an ordering of the set of items. Thus, for example, if a set of items is sorted in a sequence from "item 1," "item 2," and "item 3," the first item of a set of items may be "item 2" unless otherwise stated. Furthermore, a "set" may refer to a singular form or a plural form, such that a "set of items" may refer to one item or a plurality of items.

Enumerated Embodiments

The present techniques will be better understood with reference to the following enumerated clauses:

1. A method comprising: generating a domain-specific language (DSL) by using a language model based on a set of messages, wherein the DSL comprises a set of constructs defining a set of syntax rules; generating an output by executing the set of constructs expressed in the DSL to perform reasoning operations responsive to the set of messages; and storing, in persistent storage, an execution trace that indicates a mapping between the set of constructs and a set of portions of the output.

2. A method comprising: generating a DSL by using a language model based on a set of messages and a set of knowledge sources, wherein the DSL comprises a set of constructs defining a set of syntax rules; generating an output by executing the set of constructs expressed in the DSL to perform reasoning operations responsive to the set of messages; and storing, in persistent storage, an execution trace that indicates a mapping between the set of constructs and a set of portions of the output.

3. A method for reasoning using generated DSLs, comprising: receiving a set of messages indicating a intent specification; accessing a set of knowledge sources based on the intent specification; generating a DSL by using a language model based on the set of knowledge sources, the intent specification, the set of messages, and the set of knowledge sources, wherein the DSL comprises a set of constructs defining a set of syntax rules; generating an output by executing the set of constructs expressed in the DSL to perform reasoning operations responsive to the set of messages; and storing, in persistent storage, an execution trace that indicates a mapping between the set of constructs and a set of portions of the output.

4. A method comprising: determining, from a set of messages obtained via a communication session of a real-time communication platform, a computational intent specification; accessing a set of knowledge sources relevant to the computational intent specification; generating a DSL using a generative language model based on the computational intent specification, the set of messages, and the set of knowledge sources, wherein the DSL comprises a set of constructs defined a set of syntax rules that specifies allowable compositions of named entities and relationships extracted from the set of knowledge sources; generating an output message by executing the set of constructs expressed in the DSL to perform reasoning operations responsive to the set of messages; presenting the output message via the real-time communication platform during the communication session; and storing, in persistent storage, an execution trace that indicates a mapping between the set of constructs and a set of portions of the output message.

5. A method of any of the embodiments above, further comprising: generating a plurality of synthetic training records, each training record comprising an input representation of a problem, an expected set of DSL constructs, and a corresponding verified output; and storing the plurality of synthetic training records in persistent memory; and training the generative language model with the plurality of synthetic training records.

6. A method of any of the embodiments above, further comprising: determining a reward value based on the execution trace satisfying a stored truth set; and adjusting parameters of the generative language model by determining a set of gradient update values for the parameters based on the reward value.

7. A method of any of the embodiments above, wherein the language model is a first language model, and wherein generating the DSL comprises: executing the first language model to produce a symbolic grammar definition; and executing a second language model to modify the symbolic grammar definition based on a set of verification rules.

8. A method of any of the embodiments above, wherein generating the DSL comprises: retrieving a base grammar definition indicating a primitive construct; parsing the set of knowledge sources using the base grammar definition to determine a entity; updating the base grammar definition with a set of production rules by selecting the set of production rules based on the entity; and re-parsing the set of knowledge sources using the base grammar definition after the updating of the set of production rules.

9. A method of any of the embodiments above, further comprising: generating, from the execution trace, a reward vector comprising component reward values respectively corresponding to a set of verification criteria against a stored truth set, wherein the set of verification criteria comprises at least one of a syntax compliance criterion and a semantic consistency criterion; and updating the language model by adjusting distinct parameter subsets of the language model using a set of gradient update values derived from the reward vector.

10. A method of any of the embodiments above, further comprising: storing, in a persistent memory, an earlier representation of the DSL in association with domain classification data; determining a match between the intent specification and a value of the domain classification data; and retrieving the earlier representation of the DSL based on the match between the intent specification and the domain classification data, wherein generating the DSL comprises using the earlier representation to generate the DSL.

11. A method of any of the embodiments above, wherein storing the execution trace comprises writing, to the persistent storage, a structured data record comprising (1) a first field storing identifiers for constructs of the DSL, (2) a second field storing positions within the output, and (3) a third field storing values of intermediate computations performed by the constructs.

12. A method of any of the embodiments above, further comprising: generating a set of intermediate computation values during an execution of the set of constructs of the DSL; receiving, during the execution of the set of constructs, an update to the set of constructs in response to a detected change in the set of knowledge sources; modifying the DSL by inserting, deleting, or replacing a set of production rules during the execution of the set of constructs without terminating the execution; and continuing the execution of the set of constructs from a current execution state using the set of intermediate computation values.

13.

14. A method of any of the embodiments above, wherein the DSL is a fused DSL, and wherein generating the DSL comprises: retrieving a plurality of previously generated DSLs, wherein each respective DSLs is associated with a different respective domain classification; identifying, based on stored entity alignment rules, a set of named entities and relationships that are semantically equivalent across the plurality of previously generated DSLs; generating the fused DSL by merging production rules from the plurality of previously generated DSLs.

15. A method of any of the embodiments above, wherein the language model is a first language model, and wherein generating the DSL comprises: executing the first language model to produce a symbolic grammar definition; and executing a second language model to modify the symbolic grammar definition based on a set of verification rules.

16. A method of any of the embodiments above, wherein generating the DSL comprises: retrieving a base grammar definition indicating a primitive construct; parsing the set of knowledge sources using the base grammar definition to determine a entity; updating the base grammar definition with a set of production rules by selecting the set of production rules based on the entity; and re-parsing the set of knowledge sources using the base grammar definition after the updating of the set of production rules.

17. A method of any of the embodiments above, further comprising: generating, from the execution trace, a reward vector comprising component reward values respectively corresponding to a set of verification criteria against a stored truth set, wherein the set of verification criteria comprises at least one of a syntax compliance criterion and a semantic consistency criterion; updating the language model by adjusting distinct parameter subsets of the language model using a set of gradient update values derived from the reward vector.

18. A method of any of the embodiments above, further comprising: storing, in a persistent memory, an earlier representation of the DSL in association with domain classification data; determining a match between the intent specification and a value of the domain classification data; and retrieving the earlier representation of the DSL based on the match between the intent specification and the domain classification data, wherein generating the DSL comprises using the earlier representation to generate the DSL.

19. A method of any of the embodiments above, wherein storing the execution trace comprises writing, to the persistent storage, a structured data record comprising (1) a first field storing identifiers for constructs of the DSL, (2) a second field storing positions within the output, and (3) a third field storing values of intermediate computations performed by the constructs.

20. A method of any of the embodiments above, further comprising: generating a set of intermediate computation values during an execution of the set of constructs of the DSL; receiving, during the execution of the set of constructs, an update to the set of constructs in response to a detected change in the set of knowledge sources; modifying the DSL by inserting, deleting, or replacing a set of production rules during the execution of the set of constructs without terminating the execution; and continuing the execution of the set of constructs from a current execution state using the set of intermediate computation values.

21. A method of any of the embodiments above, wherein the DSL is a fused DSL, and wherein generating the DSL comprises: retrieving a plurality of previously generated DSLs, wherein each respective DSLs is associated with a different respective domain classification; identifying, based on stored entity alignment rules, a set of named entities and relationships that are semantically equivalent across the plurality of previously generated DSLs; generating the fused DSL by merging production rules from the plurality of previously generated DSLs.

22. A method of any of the embodiments above, further comprising: determining a reward value based on the execution trace satisfying a stored truth set; and adjusting parameters of the language model by determining a set of gradient update values for the parameters based on the reward value.

23. A tangible, non-transitory, machine-readable medium storing instructions that, when executed by a data processing apparatus, cause the data processing apparatus to perform operations comprising those of any of embodiments 1-22.

24. A system comprising one or more processors; and memory storing instructions that, when executed by the processors, cause the processors to effectuate operations comprising those of any of embodiments 1-22.

25. A system comprising means for performing any of embodiments 1-22.

What is claimed is:

1. A system for autonomous reasoning using dynamically generated domain-specific languages (DSLs), the system comprising one or more processors and one or more memories storing instructions that, when executed by the one or more processors, cause the one or more processors to perform operations comprising:

determining, from a set of messages obtained via a communication session of a real-time communication platform, a computational intent specification;

accessing a set of knowledge sources relevant to the computational intent specification;

generating a DSL using a generative language model based on the computational intent specification, the set of messages, and the set of knowledge sources, wherein the DSL comprises a set of constructs defining a set of syntax rules that specifies allowable compositions of named entities and relationships extracted from the set of knowledge sources;

generating an output message by executing the set of constructs expressed in the DSL to perform reasoning operations responsive to the set of messages;

presenting the output message via the real-time communication platform during the communication session;

storing, in persistent storage, an execution trace that indicates a mapping between the set of constructs and a set of portions of the output message;

receiving a second set of messages from a client device;

determining a second computation intent specification of the second set of messages; and responsive to a match between the second computation intent and the execution trace, generating, using the generative language model, a second output message using the set of constructs of the DSL.

2. The system of claim 1, the operations further comprising:

generating a plurality of synthetic training records, each training record comprising an input representation of a problem, an expected set of DSL constructs, and a corresponding verified output;

storing the plurality of synthetic training records in persistent memory; and training the generative language model with the plurality of synthetic training records.

3. The system of claim 1, the operations further comprising:

determining a reward value based on the execution trace satisfying a stored truth set; and adjusting parameters of the generative language model by determining a set of gradient update values for the parameters based on the reward value.

4. A method for reasoning using generated domain-specific languages (DSLs), comprising:

receiving a set of messages indicating an intent specification;

accessing a set of knowledge sources based on the intent specification;

generating a DSL by using a language model based on the intent specification, the set of messages, and the set of knowledge sources, wherein the DSL comprises a set of constructs defining a set of syntax rules;

generating an output by executing the set of constructs expressed in the DSL to perform reasoning operations responsive to the set of messages;

storing, in persistent storage, an execution trace that indicates a mapping between the set of constructs and a set of portions of the output;

receiving a second set of messages from a client device;

determining a second computation intent specification of the second set of messages; and responsive to a match between the second computation intent and the execution trace, generating, using the generative language model, a second output message using the set of constructs of the DSL.

5. The method of claim 4, wherein the language model is a first language model, and wherein generating the DSL comprises:

executing the first language model to produce a symbolic grammar definition; and executing a second language model to modify the symbolic grammar definition based on a set of verification rules.

6. The method of claim 4, wherein generating the DSL comprises:

retrieving a base grammar definition indicating a primitive construct;

parsing the set of knowledge sources using the base grammar definition to determine an entity;

updating the base grammar definition with a set of production rules by selecting the set of production rules based on the entity; and re-parsing the set of knowledge sources using the base grammar definition after the updating of the set of production rules.

7. The method of claim 4, further comprising:

generating, from the execution trace, a reward vector comprising component reward values respectively corresponding to a set of verification criteria against a stored truth set, wherein the set of verification criteria comprises at least one of a syntax compliance criterion and a semantic consistency criterion; and updating the language model by adjusting distinct parameter subsets of the language model using a set of gradient update values derived from the reward vector.

8. The method of claim 4, further comprising:

storing, in a persistent memory, an earlier representation of the DSL in association with domain classification data;

determining a match between the intent specification and a value of the domain classification data; and retrieving the earlier representation of the DSL based on the match between the intent specification and the domain classification data, wherein generating the DSL comprises using the earlier representation to generate the DSL.

9. The method of claim 4, wherein storing the execution trace comprises writing, to the persistent storage, a structured data record comprising (1) a first field storing identifiers for constructs of the DSL, (2) a second field storing positions within the output, and (3) a third field storing values of intermediate computations performed by the constructs.

10. The method of claim 4, further comprising:

generating a set of intermediate computation values during an execution of the set of constructs of the DSL;

receiving, during the execution of the set of constructs, an update to the set of constructs in response to a detected change in the set of knowledge sources;

modifying the DSL by inserting, deleting, or replacing a set of production rules during the execution of the set of constructs without terminating the execution; and continuing the execution of the set of constructs from a current execution state using the set of intermediate computation values.

11. The method of claim 4, wherein the DSL is a fused DSL, and wherein generating the DSL comprises:

retrieving a plurality of previously generated DSLs, wherein each respective DSL is associated with a different respective domain classification;

identifying, based on stored entity alignment rules, a set of named entities and relationships that are semantically equivalent across the plurality of previously generated DSLs; and generating the fused DSL by merging production rules from the plurality of previously generated DSLs.

12. One or more non-transitory, machine-readable media storing program instructions that, when executed by one or more processors, causes the one or more processors to perform operations comprising:

receiving a set of messages indicating an intent specification;

accessing a set of knowledge sources based on the intent specification;

generating a DSL by using a language model based on the intent specification, the set of messages, and the set of knowledge sources, wherein the DSL comprises a set of constructs defining a set of syntax rules;

generating an output by executing the set of constructs expressed in the DSL to perform reasoning operations responsive to the set of messages;

storing, in persistent storage, an execution trace that indicates a mapping between the set of constructs and a set of portions of the output;

receiving a second set of messages from a client device;

determining a second computation intent specification of the second set of messages; and responsive to a match between the second computation intent and the execution trace, generating, using the generative language model, a second output message using the set of constructs of the DSL.

13. The one or more non-transitory, machine-readable media of claim 12, wherein the language model is a first language model, and wherein generating the DSL comprises:

executing the first language model to produce a symbolic grammar definition; and executing a second language model to modify the symbolic grammar definition based on a set of verification rules.

14. The one or more non-transitory, machine-readable media of claim 12, wherein generating the DSL comprises:

retrieving a base grammar definition indicating a primitive construct;

parsing the set of knowledge sources using the base grammar definition to determine an entity;

updating the base grammar definition with a set of production rules by selecting the set of production rules based on the entity; and re-parsing the set of knowledge sources using the base grammar definition after the updating of the set of production rules.

15. The one or more non-transitory, machine-readable media of claim 12, the operations further comprising:

generating, from the execution trace, a reward vector comprising component reward values respectively corresponding to a set of verification criteria against a stored truth set, wherein the set of verification criteria comprises at least one of a syntax compliance criterion and a semantic consistency criterion; and updating the language model by adjusting distinct parameter subsets of the language model using a set of gradient update values derived from the reward vector.

16. The one or more non-transitory, machine-readable media of claim 12, the operations further comprising:

storing, in a persistent memory, an earlier representation of the DSL in association with domain classification data;

determining a match between the intent specification and a value of the domain classification data; and retrieving the earlier representation of the DSL based on the match between the intent specification and the domain classification data, wherein generating the DSL comprises using the earlier representation to generate the DSL.

17. The one or more non-transitory, machine-readable media of claim 12, wherein storing the execution trace comprises writing, to the persistent storage, a structured data record comprising (1) a first field storing identifiers for constructs of the DSL, (2) a second field storing positions within the output, and (3) a third field storing values of intermediate computations performed by the constructs.

18. The one or more non-transitory, machine-readable media of claim 12, the operations further comprising:

generating a set of intermediate computation values during an execution of the set of constructs of the DSL;

receiving, during the execution of the set of constructs, an update to the set of constructs in response to a detected change in the set of knowledge sources;

modifying the DSL by inserting, deleting, or replacing a set of production rules during the execution of the set of constructs without terminating the execution; and continuing the execution of the set of constructs from a current execution state using the set of intermediate computation values.

19. The one or more non-transitory, machine-readable media of claim 12, wherein the DSL is a fused DSL, and wherein generating the DSL comprises:

retrieving a plurality of previously generated DSLs, wherein each respective DSLs is associated with a different respective domain classification;

identifying, based on stored entity alignment rules, a set of named entities and relationships that are semantically equivalent across the plurality of previously generated DSLs; and generating the fused DSL by merging production rules from the plurality of previously generated DSLs.

20. The one or more non-transitory, machine-readable media of claim 12, the operations further comprising:

determining a reward value based on the execution trace satisfying a stored truth set; and adjusting parameters of the language model by determining a set of gradient update values for the parameters based on the reward value.

* * * * *